United States Patent
Kobayashi et al.

(10) Patent No.: US 10,789,007 B2
(45) Date of Patent: Sep. 29, 2020

(54) INFORMATION PROCESSING SYSTEM, MANAGEMENT DEVICE, AND CONTROL METHOD

(71) Applicant: FUJITSU LIMITED, Kawasaki-shi, Kanagawa (JP)

(72) Inventors: Yuuichi Kobayashi, Fuji (JP); Keiji Miyauchi, Yokohama (JP); Junichi Matsuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/426,601

(22) Filed: May 30, 2019

(65) Prior Publication Data
US 2020/0004452 A1    Jan. 2, 2020

(30) Foreign Application Priority Data
Jun. 29, 2018    (JP) ................................ 2018-124348

(51) Int. Cl.
*G06F 11/14* (2006.01)
*G06F 3/06* (2006.01)

(52) U.S. Cl.
CPC .......... *G06F 3/0647* (2013.01); *G06F 3/0604* (2013.01); *G06F 3/0644* (2013.01); *G06F 3/0652* (2013.01); *G06F 3/0689* (2013.01); *G06F 11/1456* (2013.01)

(58) Field of Classification Search
None
See application file for complete search history.

(56) References Cited

U.S. PATENT DOCUMENTS 9,201,607 B2 * 12/2015 Satoyama ............... G06F 12/02
2004/0205310 A1 * 10/2004 Yamagami .......... G06F 11/2069
                                                                711/162

FOREIGN PATENT DOCUMENTS

JP    2005-165781    6/2005
JP    2008-003857    1/2008

* cited by examiner

*Primary Examiner* — Brian R Peugh
(74) *Attorney, Agent, or Firm* — Fujitsu Patent Center

(57) ABSTRACT

A management device includes a processor that determines, upon receiving a request for deletion of a first volume set in a first storage area of a first storage device, whether a second volume different from the first volume is set in the first storage area. The processor detects, when it is determined that the second volume is set, a continuous empty area equal to or larger than the second volume from among storage areas of a second storage device. The processor causes the first storage device to perform the deletion of the first volume from the first storage area, evacuation of data of the second volume to the continuous empty area, and upon completion of the evacuation, migration of the second volume to a migration destination area within the first storage area from the second storage device.

10 Claims, 21 Drawing Sheets

| USER NAME | USER ID |
|---|---|
| AA CORPORATION | 0001 |
| BB CORPORATION | 0002 |
| ... | ... |

FIG. 9

| USER NAME | HOST NAME | VIRTUAL SERVER NAME | PHYSICAL SERVER NAME | CLUSTER GROUP | TYPE | MACHINE TYPE | OS TYPE |
|---|---|---|---|---|---|---|---|
| 0001 | AAA | Dom0001 | HW001 | A | REDUNDANT | 2 | OS11u3 |
| 0001 | AAB | Dom0002 | HW002 | B | REDUNDANT | 2 | OS11u3 |
| 0002 | CCC | Dom0003 | HW003 | — | 1 | 1 | OS11u3 |
| ... | ... | ... | ... | ... | ... | ... | ... |

| VIRTUAL SERVER NAME | LUN NUMBER | VIRTUAL DISK ID | VOLUME NAME | DISK TYPE |
|---|---|---|---|---|
| Dom0001 | 1101 | 1101 | vd-1101 | SHARED |
| Dom0002 | 1101 | 1101 | vd-1101 | SHARED |
| Dom0003 | 1102 | 1102 | vd-1102 | SINGLE |
| ... | ... | ... | ... | ... |

| STORAGE DEVICE NAME | RAID GROUP NAME | VOLUME NUMBER | VOLUME NAME | SIZE |
|---|---|---|---|---|
| ET200-1 | RG020 | 1101 | vd-1101 | 1 TB |
| ET200-1 | RG020 | 1101 | vd-1101 | 1 TB |
| ET200-2 | RG000 | 1102 | vd-1102 | 120 GB |
| ... | ... | ... | ... | ... |

| STORAGE DEVICE NAME | RAID GROUP NAME | RAID SIZE | VOLUME NAME | SIZE | STATUS |
|---|---|---|---|---|---|
| ET200-2 | RG000 | 1 TB | vd-1101 | 300 G | Used |
| | | | vd-1102 | 120 G | Used |
| | | | | | Free |
| | RG001 | 1 TB | vd-1103 | 300 G | Used |
| | | | vd-1104 | 300 G | Used |
| | | | vd-1105 | 300 G | Reserved |
| | | | | | Free |
| ... | ... | ... | ... | ... | ... |

| USER INFORMATION | | VIRTUAL SERVER NAME | PHYSICAL SERVER NAME | OPERATION TYPE | VOLUME NUMBER |
|---|---|---|---|---|---|
| USER NAME | USER ID | | | | |
| AA CORPORATION | 00001 | Dom0001 | HW001 | DELETE | 1101 |
| AA CORPORATION | 00001 | Dom0002 | HW002 | DELETE | 1101 |
| BB CORPORATION | 00002 | Dom0003 | HW003 | DELETE | 1102 |

| USER INFORMATION | | VIRTUAL SERVER NAME | PHYSICAL SERVER NAME | OPERATION TYPE | STORAGE DEVICE NAME | LUN NUMBER |
|---|---|---|---|---|---|---|
| USER NAME | USER ID | | | | | |
| AA CORPORATION | 00001 | Dom0001 | HW001 | DELETE | ET200-1 | 1101 |
| AA CORPORATION | 00001 | Dom0002 | HW002 | DELETE | ET200-1 | 1101 |
| BB CORPORATION | 00002 | Dom0003 | HW003 | DELETE | ET200-2 | 1102 |

| RAID GROUP NAME | VOLUME INFORMATION | | | | |
|---|---|---|---|---|---|
| | VOLUME NUMBER | VOLUME NAME | SIZE | DISK TYPE | STATUS |
| RG020 | 1101 | vd-1101 | 1 TB | SHARED | Used |
| RG020 | 1101 | vd-1101 | 1 TB | SHARED | Used |
| RG000 | 1102 | vd-1102 | 120 GB | SINGLE | Reserved |

INFORMATION PROCESSING SYSTEM, MANAGEMENT DEVICE, AND CONTROL METHOD

CROSS-REFERENCE TO RELATED APPLICATION

This application is based upon and claims the benefit of priority of the prior Japanese Patent Application No. 2018-124348, filed on Jun. 29, 2018, the entire contents of which are incorporated herein by reference.

FIELD

The embodiments discussed herein are related to an information processing system, a management device and a control method.

BACKGROUND

An example of a storage system includes a system in which a plurality of logical volumes is set in a storage area of a storage device and operated. In such a storage system, for example, it is possible to perform an operation in which each logical volume is used for an individual user, or each logical volume is accessed from an individual server device. This makes it possible to use the storage area of the storage device efficiently by a plurality of users and a plurality of server devices.

A logical volume may be set in a redundant array of independent disks (RAID) group which is a logical storage area implemented by a plurality of physical disks. For example, there is a storage device in which the capacity thereof may be expanded from a state in which a plurality of logical volumes is set in the RAID group by adding a physical disk without destroying the stored data.

In addition, known techniques related to data storage include a process referred to as "defragmentation" in which fragmented data in a storage area is migrated to a continuous area. For example, there is a recording/reproducing system in which a hard disk drive (HDD) autonomously performs defragmentation with respect to a magnetic disk therein.

Related techniques are disclosed in, for example, Japanese Laid-open Patent Publication No. 2008-3857, and Japanese Laid-open Patent Publication No. 2005-165781.

When setting a volume in a certain storage area, there is a method of making the address on the volume same as the address on the storage area in which the volume is set. In this method, when accessing volume data, it is not required to convert the address of the data on the volume to the address of the storage area in which the volume is set. Therefore, compared with the case of using a virtual address as an address of a volume, for example, there is an advantage that the processing load for access is small.

On the other hand, when this method is used, there are the following problems. For example, suppose that a first volume is deleted from a state in which the first volume and a second volume are set in order from the top of a storage area, forming an empty area. In this state, when trying to set a new volume in the formed empty area, only a volume that is equal to or smaller than the capacity of the deleted first volume may be newly set, and it is not possible to newly set a volume having a capacity exceeding the capacity of the deleted first volume. Due to such restrictions, there is a problem that the utilization efficiency of the storage area is not high.

SUMMARY

According to an aspect of the present invention, provided is a management device including a processor configured to determine, upon receiving a request for deletion of a first volume set in a first storage area among one or more storage areas of a first storage device among a plurality of storage devices, whether a second volume different from the first volume is set in the first storage area based on management information for managing a setting state of volumes in each of the one or more storage areas of each of the plurality of storage devices. Each of the one or more volumes has an address space same as an address space of an area, in which each of the one or more volumes is set, within a storage area among the one or more storage areas. The processor is configured to detect, when it is determined that the second volume is set, a continuous empty area equal to or larger than the second volume from among the one or more storage areas of a second storage device among the plurality of storage devices based on the management information. The processor is configured to cause the first storage device to perform the deletion of the first volume from the first storage area. The processor is configured to cause the first storage device to perform evacuation of data of the second volume to the continuous empty area. The processor is configured to cause the first storage device to perform, upon completion of the evacuation, migration of the second volume by writing the data of the second volume back to a migration destination area within the first storage area from the second storage device. The migration destination area includes an area in which the first volume is set before the deletion of the first volume. The processor is configured to update the management information to indicate that the first volume has been deleted and the second volume has been migrated.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an exemplary configuration of a user table;

FIG. 9 is a diagram illustrating an exemplary configuration of a virtual server table;

FIG. 10 is a diagram illustrating an exemplary configuration of a virtual disk table;

FIG. 11 is a diagram illustrating an exemplary configuration of a volume table;

FIG. 12 is a diagram illustrating an exemplary configuration of a storage area management table;

FIG. 13 is a diagram illustrating an exemplary configuration of a reservation data management table;

FIG. 14 is a diagram illustrating an exemplary configuration of a collected data management table;

DESCRIPTION OF EMBODIMENTS

Hereinafter, embodiments will be described with reference to the drawings.

First Embodiment

Figure 1:
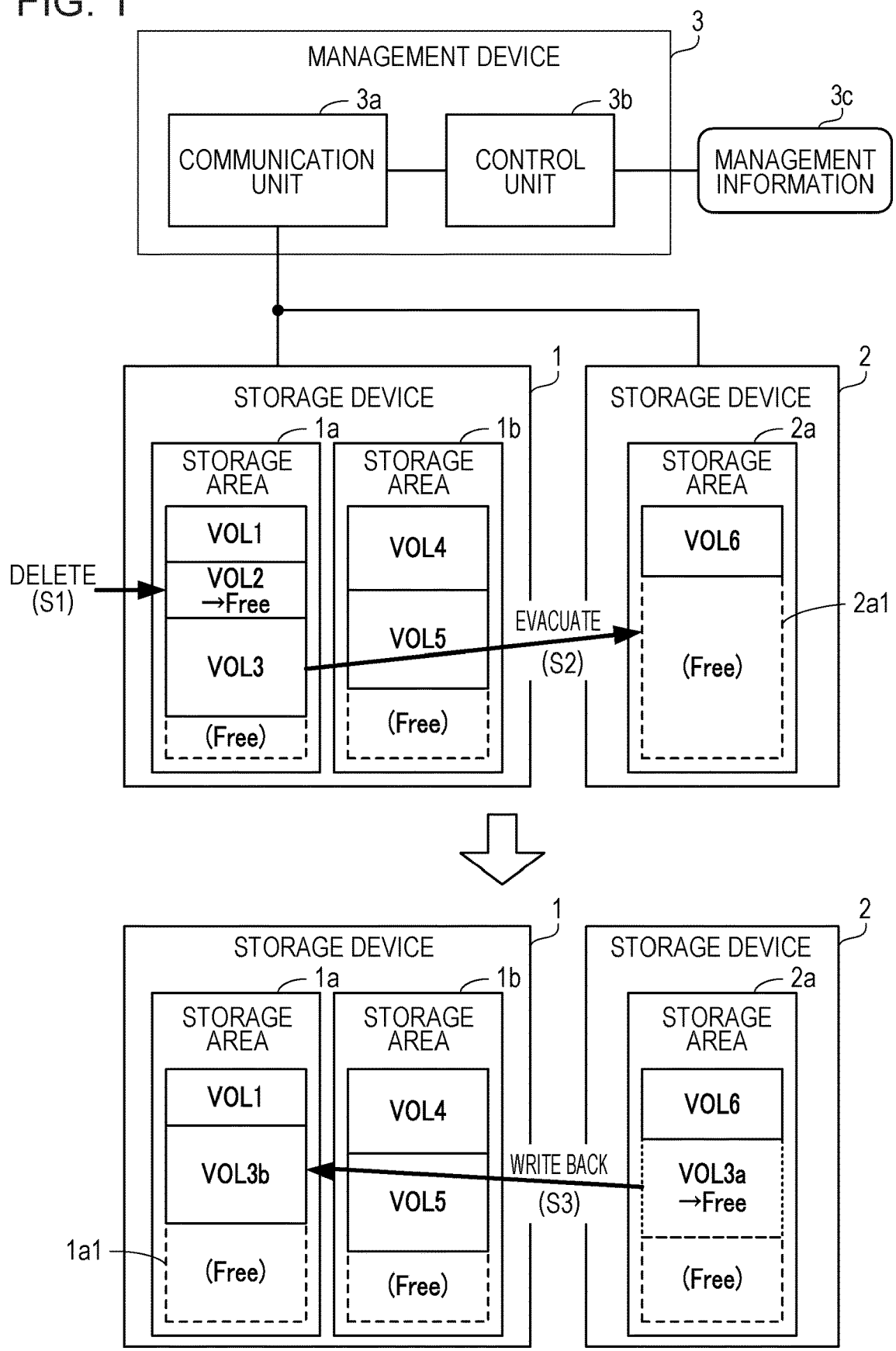
FIG. 1 is a diagram illustrating an exemplary configuration and exemplary processing of an information processing system according to a first embodiment.

FIG. 1 is a diagram illustrating an exemplary configuration and exemplary processing of an information processing system according to a first embodiment. The information processing system illustrated in FIG. 1 includes storage devices 1 and 2 and a management device 3. Storage devices included in the information processing system are not limited to the two storage devices 1 and 2 as illustrated in FIG. 1, and may be three or more storage devices.

Each of the storage devices 1 and 2 has one or more storage areas. In the example of FIG. 1, the storage device 1 has storage areas 1$a$ and 1$b$, and the storage device 2 has a storage area 2$a$. The storage areas 1$a$, 1$b$, and 2$a$ may be physical storage areas respectively implemented by individual memory devices or logical storage areas implemented by one or more memory devices.

One or more volumes may be set for each of the storage areas 1$a$, 1$b$, and 2$a$. In the example of FIG. 1, volumes VOL1, VOL2, and VOL3 are set in the storage area 1$a$ in order from the top address. Volumes VOL4 and VOL5 are set in the storage area 1$b$ in order from the top address. A volume VOL6 is set at the top address in the storage area 2$a$. In FIG. 1, an area described as "Free" is an empty area in which no volume is set.

The volume set in each of the storage areas 1$a$, 1$b$, and 2$a$ has an address space same as an address space of an area in the storage area, in which the volume is set. For example, in a case where the volume VOL1 is set in an area from an address "0" to an address "A1" of the storage area 1$a$, the top address of the volume VOL1 is "0" and the end address thereof is "A1". In a case where the volume VOL2 is set in an area from an address "A1+1" to an address "A2" in the storage area 1$a$, the top address of the volume VOL2 is "A1+1" and the end address thereof is "A2".

By using such an address allocation method for a volume, when accessing a volume, it is not required to convert a logical address specific to the volume to an address of the storage area in which the volume is set. Therefore, the processing load for data access is reduced, and the access speed may be improved.

However, by using the address allocation method as described above, one volume is required to be set in a continuous empty area in the storage areas 1$a$, 1$b$, and 2$a$. For example, it is not possible to divide one volume and set the divided pieces of the one volume in respective discrete plural empty areas. In addition, it is not possible to use divided pieces of one volume set in respective discrete plural empty areas as one volume.

The management device 3 includes a communication unit 3$a$ and a control unit 3$b$. The function of the communication unit 3$a$ is implemented, for example, by a communication interface circuit. The communication unit 3$a$ performs communication with the storage devices 1 and 2.

The function of the control unit 3$b$ is implemented, for example, by a processor. The control unit 3$b$ may communicate with the storage devices 1 and 2 via the communication unit 3$a$. The control unit 3$b$ may refer to management information 3$c$. The management information 3$c$ is information for managing the setting state of volumes in the storage areas 1$a$, 1$b$, and 2$a$. For example, the management information 3$c$ may be stored in a memory device installed inside the management device 3 or may be stored in a device different from the management information 3$c$.

When deletion of the set volume is requested, the control unit 3$b$ performs the following process. Here, as an example, it is assumed that deletion of the volume VOL2 set in the storage area 1$a$ is requested.

Based on the management information 3$c$, the control unit 3$b$ determines whether another volume is set in the storage area 1$a$. In a case where another volume is set, the control unit 3$b$ selects a continuous empty area equal to or larger than the set other volume from the storage areas 1$a$, 1$b$, and 2$a$ based on the management information 3$c$.

The other volume determined in the above-described process is a volume existing in front of or behind the volume VOL2 which is requested to be deleted. For example, it is assumed that when volumes are sequentially set in the storage area 1$a$, the volumes are set in the storage area 1$a$ in order from the top address of the storage area 1$a$. In this case, in the above-described determination, the control unit 3$b$ determines whether another volume is set at an address lower than the address of the volume VOL2 in the storage area 1$a$. In the example of FIG. 1, it is determined that the volume VOL3 is set at an address lower than the address of the volume VOL2. In this case, based on the management information 3$c$, the control unit 3$b$ detects a continuous empty area equal to or larger than the volume VOL3 from the storage areas 1$a$, 1$b$, and 2$a$. In the example of FIG. 1, it is assumed that an empty area 2$a$1 satisfying the condition is detected from the storage area 2$a$.

Next, the control unit 3$b$ causes the storage device 1 to perform a deletion process of deleting the volume VOL2 from the storage area 1$a$ (step S1). The control unit 3$b$ also causes the storage device 1 to perform a migration process of migrating the volume VOL3. In the migration process, the following process is performed.

The storage device 1 evacuates the data of the volume VOL3 to the detected empty area 2$a$1 (step S2). In FIG. 1, due to this evacuation, a volume VOL3$a$ having contents identical to the contents of the volume VOL3 is set in the storage area 2$a$. The storage device 1 writes the data of the evacuated volume VOL3a back to a migration destination area in the storage area 1a, which includes the area from which the volume VOL2 has been deleted (step S3).

For example, in a case where volumes are set in order from the top address of the storage area 1a as described above, the storage device 1 writes the data of the volume VOL3a back to a migration destination area starting from the top of the area from which the volume VOL2 in the storage area 1a has been deleted. In FIG. 1, by this write-back, a volume VOL3b having contents identical to the contents of the volume VOL3a is set in the storage area 1a.

As a result of such a migration process, the volume VOL3 is relocated to the empty area formed by deleting the volume VOL2 in the storage area 1a such that the volume VOL3 starts from the highest address of the empty area. As a result, a continuous empty area 1a1 larger than the volume VOL2 is formed in the storage area 1a.

Thereafter, the control unit 3b updates the management information 3c so as to indicate that the volume VOL2 is deleted from the storage area 1a and that the volume VOL3 has migrated in the storage area 1a. Here, for example, in a case where the volume VOL2 is simply deleted and an empty area with a size same as the size of the volume VOL2 is formed, this empty area may be used only for setting a volume equal to or smaller than the volume VOL2. For this reason, the utilization efficiency of the storage area 1a deteriorates.

In contrast, in the migration process described above, the continuous empty area 1a1 larger than the volume VOL2 is formed in the storage area 1a, so that it is possible to newly set a volume larger than the volume VOL2 in this empty area 1a1. As a result, the utilization efficiency of the storage area 1a after deleting the volume VOL2 may be improved.

Instead of the storage device, the control unit 3b of the management device 3 performs the determination of necessity of migration of another volume contingent to the volume deletion and the detection of the evacuation destination area of the other volume in an integrated fashion while referring to the management information 3c. The deletion process and the migration process in the storage device are performed under the control of the control unit 3b of the management device 3. As a result, the volume migration process may be performed accurately. In addition, it is possible to reduce the processing load of the storage device, and to suppress a reduction in access speed to the volume set in the storage device.

Second Embodiment

Next, as an example of the information processing system illustrated in FIG. 1, a cloud infrastructure system will be described. This cloud infrastructure system provides a cloud infrastructure service (Infrastructure as a Service: IaaS) to users.

Figure 2:
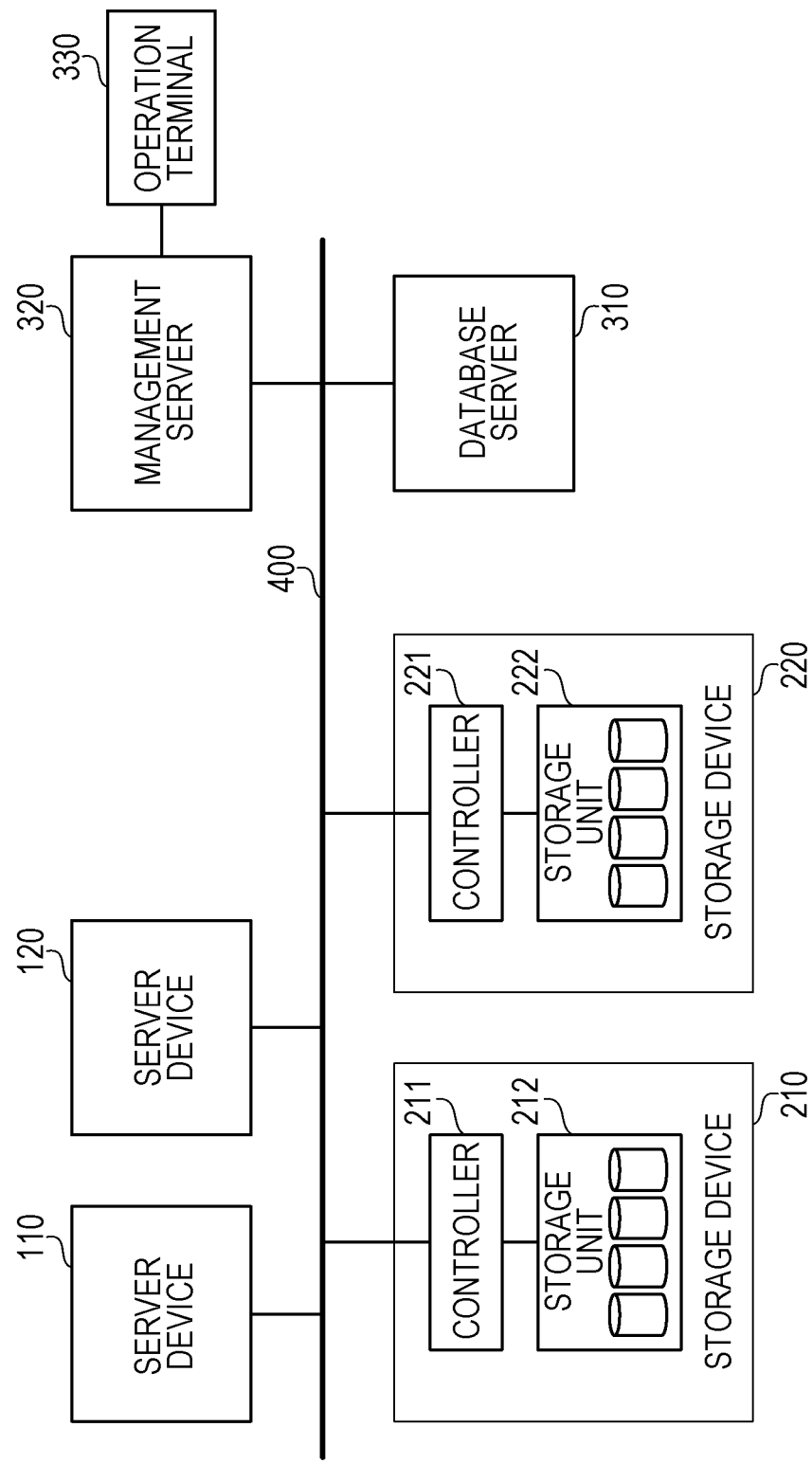
FIG. 2 is a diagram illustrating an exemplary configuration of a cloud infrastructure system according to a second embodiment.

FIG. 2 is a diagram illustrating an exemplary configuration of a cloud infrastructure system according to a second embodiment. The cloud infrastructure system illustrated in FIG. 2 includes server devices 110 and 120, storage devices 210 and 220, a database server 310, a management server 320, and an operation terminal 330. The server devices 110 and 120, the storage devices 210 and 220, the database server 310, and the management server 320 are coupled to each other via a network 400. The operation terminal 330 operated by an administrator is coupled to the management server 320.

The storage devices 210 and 220 are examples of the storage devices 1 and 2 illustrated in FIG. 1, and the management server 320 is an example of the management device 3 illustrated in FIG. 1. One or more virtual machines operate on each of the server devices 110 and 120. The one or more virtual machines are utilized as, for example, virtual servers by a user. For example, the user may execute an application program on the one or more virtual machines.

The storage devices 210 and 220 implement a real storage area of a virtual disk coupled to a virtual machine operating on the server devices 110 and 120. The storage device 210 includes a controller 211 and a storage unit 212. The storage device 220 includes a controller 221 and a storage unit 222.

Each of the storage units 212 and 222 includes a plurality of memory devices, such as an HDD and a solid state drive (SSD), for implementing a real storage area of the virtual disk. In response to a request from the server devices 110 and 120, the controller 211 accesses the memory device included in the storage unit 212. In response to a request from the server devices 110 and 120, the controller 221 accesses the memory device included in the storage unit 222.

The controllers 211 and 221 control the writing of data to the memory devices mounted in the storage units 212 and 222 using the RAID technique. One or more RAID groups are set in each of the storage units 212 and 222. The RAID group is a logical storage area implemented by using a plurality of memory devices whose writing is controlled by the RAID technique. A volume (logical storage area) corresponding to each virtual disk is allocated to the RAID group.

The database server 310 is a server device that holds information for managing the usage status of various resources included in the cloud infrastructure system. For example, the database server 310 holds information of a user that uses the cloud infrastructure service, information indicating correspondence between a virtual machine used by the user and the server devices 110 and 120, information indicating correspondence between a virtual disk, a volume, a RAID group, and the like.

The management server 320 is a server device that manages the cloud infrastructure system while referring to the information held in the database server 310. For example, the management server 320 performs a process of setting a virtual machine, a virtual disk, a RAID group, a volume, and the like in accordance with an input operation performed by an administrator through the operation terminal 330. In a case where there is a change in the setting, the management server 320 reflects the change on the information held by the database server 310.

Figure 3:
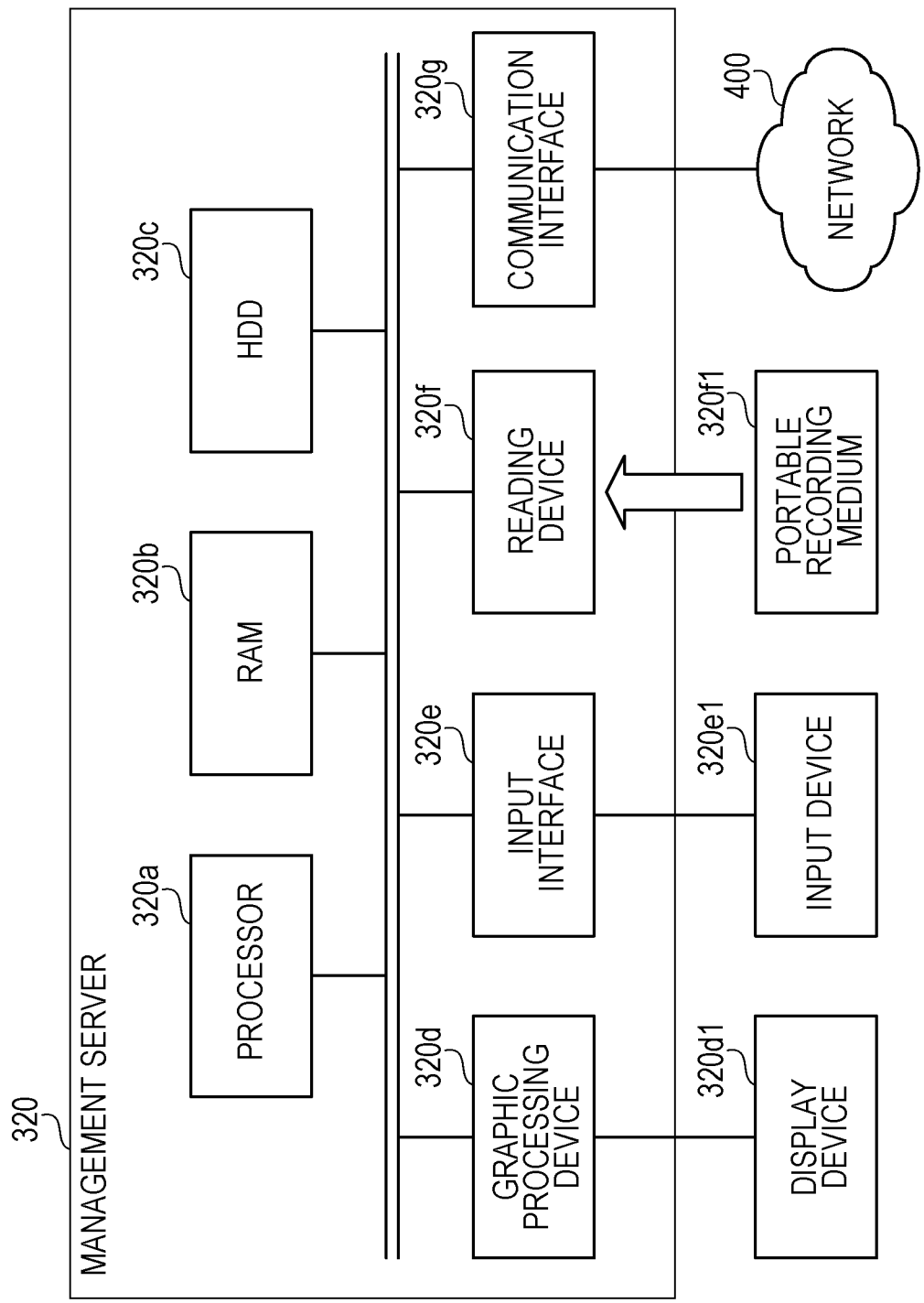
FIG. 3 is a diagram illustrating an exemplary hardware configuration of a management server.

FIG. 3 is a diagram illustrating an exemplary hardware configuration of the management server. The function of the management server 320 is implemented, for example, by a computer as illustrated in FIG. 3.

The management server 320 illustrated in FIG. 3 includes a processor 320a, a random access memory (RAM) 320b, an HDD 320c, a graphic processing device 320d, an input interface 320e, a reading device 320f, and a communication interface 320g. The processor 320a is an example of the control unit 3b illustrated in FIG. 1, and the communication interface 320g is an example of the communication unit 3a illustrated in FIG. 1.

The processor 320a performs overall control of the management server 320 as a whole. Examples of the processor 320a include a central processing unit (CPU), a micro processing unit (MPU), a digital signal processor (DSP), an application specific integrated circuit (ASIC) and a programmable logic device (PLD). The processor 320a may be a combination of two or more of the CPU, the MPU, the DSP, the ASIC, and the PLD.

The RAM 320b is used as a main memory device of the management server 320. The RAM 320b temporarily stores therein at least part of an operating system (OS) program and an application program both of which are executed by the processor 320a. The RAM 320b stores therein various data which is used for processing by the processor 320a.

The HDD 320c is used as an auxiliary memory device of the management server 320. The HDD 320c stores the OS program, the application program, and various data. Other types of nonvolatile memory devices such as an SSD may be used as the auxiliary memory device.

A display device 320d1 is coupled to the graphic processing device 320d. The graphic processing device 320d causes the display device 320d1 display an image in accordance with a command from the processor 320a. Examples of the display device include a liquid crystal display and an organic electroluminescence (EL) display.

An input device 320e1 is coupled to the input interface 320e. The input interface 320e transmits a signal output from the input device 320e1 to the processor 320a. Examples of the input device 320e1 include a keyboard and a pointing device. Examples of the pointing device include a mouse, a touch panel, a tablet, a touch pad, and a track ball.

A portable recording medium 320f1 is removably attached to the reading device 320f. The reading device 320f reads data recorded on the portable recording medium 320f1 and transmits the read data to the processor 320a. Examples of the portable recording medium 320f1 include an optical disk, a magneto-optical disk, and a semiconductor memory.

The communication interface 320g transmits and receives data to and from other devices such as the database server 310 via the network 400. With the above-described hardware configuration, the processing function of the management server 320 may be implemented. The functions of the database server 310, the server devices 110 and 120, and the controllers 211 and 221 may also be implemented by a computer as illustrated in FIG. 3.

Figure 4:
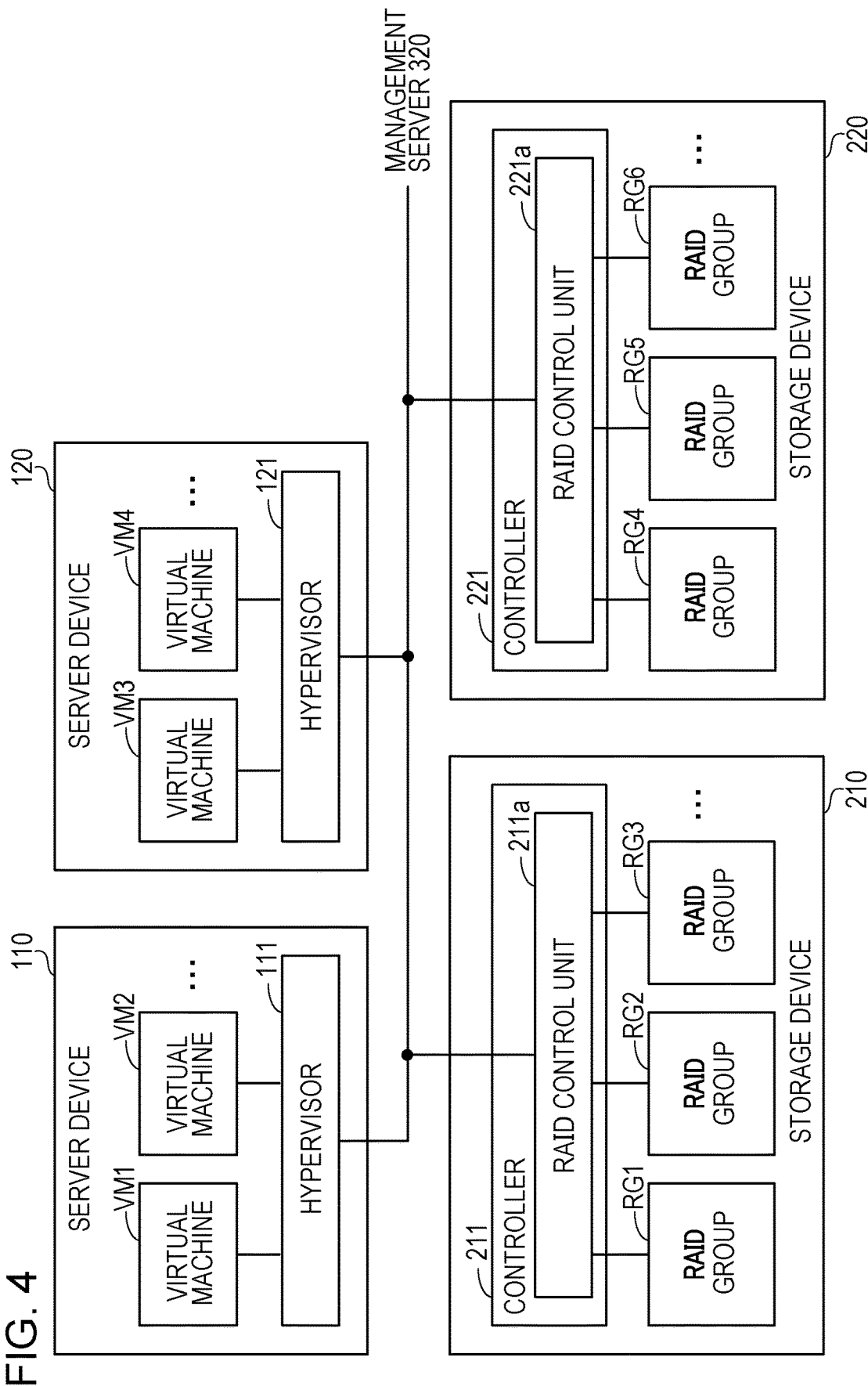
FIG. 4 is a diagram illustrating exemplary functional configurations of a server device and a storage device.

FIG. 4 is a diagram illustrating exemplary functional configurations of the server device and the storage device. The server device 110 includes a hypervisor 111. The process of the hypervisor 111 is implemented, for example, by a processor (not illustrated) included in the server device 110 that executes a predetermined program. The hypervisor 111 constructs a virtual machine on the server device 110 and manages the operation of the constructed virtual machine. In the example of FIG. 4, virtual machines VM1 and VM2 operate on the server device 110 under the management of the hypervisor 111.

Similarly, the server device 120 includes a hypervisor 121. The process of the hypervisor 121 is implemented, for example, by a processor (not illustrated) included in the server device 120 that executes a predetermined program. The hypervisor 121 constructs a virtual machine on the server device 120 and manages the operation of the constructed virtual machine. In the example of FIG. 4, virtual machines VM3 and VM4 operate on the server device 120 under the management of the hypervisor 121.

The controller 211 of the storage device 210 includes a RAID control unit 211a. The process of the RAID control unit 211a is implemented, for example, by a processor (not illustrated) included in the controller 211 that executes a predetermined program. In response to a request from the server devices 110 and 120, the RAID control unit 211a controls access to the memory device included in the storage unit 212 by using the RAID technique. In accordance with a command from the management server 320, the RAID control unit 211a performs the process such as setting of RAID groups and volumes, relocation of volumes to be described later, and the like.

Similarly, the controller 221 of the storage device 220 includes a RAID control unit 221a. The process of the RAID control unit 221a is implemented, for example, by a processor (not illustrated) included in the controller 221 that executes a predetermined program. In response to a request from the server devices 110 and 120, the RAID control unit 221a controls access to the memory device included in the storage unit 222 by using the RAID technique. In accordance with a command from the management server 320, the RAID control unit 221a performs the process such as setting of RAID groups and volumes, relocation of volumes to be described later, and the like.

In the example of FIG. 4, RAID groups RG1, RG2, and RG3 are set in the storage device 210 using the memory device included in the storage unit 212. RAID groups RG4, RG5, and RG6 are set in the storage device 220 using the memory device included in the storage unit 222.

Figure 5:
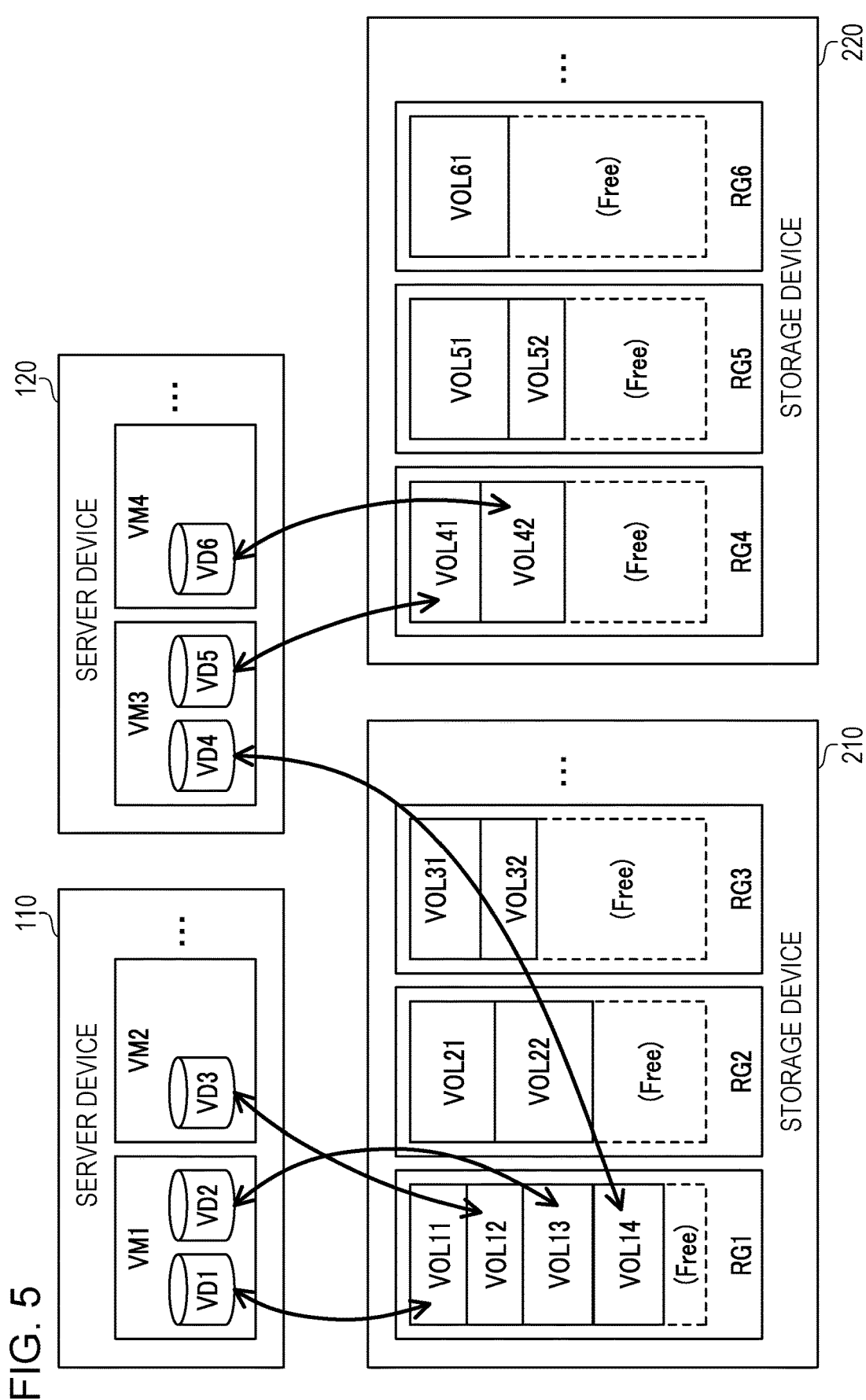
FIG. 5 is a diagram illustrating a relationship between a virtual disk and a volume.

FIG. 5 is a diagram illustrating the relationship between the virtual disk and the volume. As described above, volumes are allocated to the RAID groups set in the storage devices 210 and 220. The volume is used as a storage area corresponding to a virtual disk coupled (mounted) to a virtual machine that operates on the server devices 110 and 120.

In the example of FIG. 5, the virtual machines VM1 and VM2 operate on the server device 110. Virtual disks VD1 and VD2 are coupled to the virtual machine VM1, and a virtual disk VD3 is coupled to the virtual machine VM2. The virtual machines VM3 and VM4 operate on the server device 120. Virtual disks VD4 and VD5 are coupled to the virtual machine VM3, and a virtual disk VD6 is coupled to the virtual machine VM4.

On the other hand, the RAID groups RG1, RG2, and RG3 are set in the storage device 210 using the memory device included in the storage unit 212. The RAID groups RG4, RG5, and RG6 are set in the storage device 220 using the memory device included in the storage unit 222.

Volumes VOL11 to VOL14 are allocated to the RAID group RG1. Volumes VOL21 and VOL22 are allocated to the RAID group RG2. Volumes VOL31 and VOL32 are allocated to the RAID group RG3. Volumes VOL41 and VOL42 are allocated to the RAID group RG4. Volumes VOL51 and VOL52 are allocated to the RAID group RG5. The volume VOL61 is allocated to the RAID group RG6.

The volume VOL11 is associated with the virtual disk VD1, the volume VOL12 is associated with the virtual disk VD3, the volume VOL13 is associated with the virtual disk VD2, and the volume VOL14 is associated with the virtual disk VD4. The volume VOL41 is associated with the virtual disk VD5, and the volume VOL42 is associated with the virtual disk VD6.

"Free" described in FIG. 5 indicates an empty area to which no volume is allocated among the logical storage areas of the RAID group. When volumes are allocated to a RAID group, volumes are allocated in order from the top of the logical storage area of the RAID group without an empty area between the volumes. Therefore, normally, in the RAID group to which one or more volumes are allocated, while an empty area may exist at the end of the logical storage area, no empty area exists at the top of the logical storage area.

The following control is performed between the virtual disk and the volume associated with the virtual disk. For example, when data is written to the virtual disk VD1 by the virtual machine VM1, a write request is transmitted from the server device 110 to the RAID control unit 211a of the storage device 210. In this write request, a write address on the virtual machine VM1 is designated as a write destination. The RAID control unit 211a converts the designated write address into an address on the volume VOL11 and writes the data requested to be written to the volume VOL1. At this time, the data write process is performed on a plurality of memory devices mounted in the storage unit 212 and belonging to the RAID group RG1 in accordance with a predetermined RAID level.

As described above, in the cloud infrastructure system according to the present embodiment, when a virtual disk is newly coupled to a certain virtual machine, the volume corresponding to that virtual disk is allocated to any RAID group. The access process to the virtual disk is virtually implemented by accessing the volume corresponding to the virtual disk.

In the cloud infrastructure system, it is possible to allocate a storage area having a capacity and access performance conformable to the user's request to the virtual disk under the control of the management server 320.

For example, it is assumed that the memory devices belonging to the RAID groups RG2 and RG3 have higher access performance than the memory devices belonging to the RAID group RG1. In addition, it is assumed that a user who uses the virtual machine VM1 initially requests a specification with a low access performance and a low usage fee as a specification of the virtual disk VD1. In this case, the management server 320 allocates the volume VOL11 corresponding to the virtual disk VD1 to, for example, the RAID group RG1 as illustrated in FIG. 5 in accordance with the request by the user.

Thereafter, when the user requests that the access performance of the virtual disk VD1 be increased, the management server 320 may move, for example, the allocation destination of the volume VOL11 from the RAID group RG1 to the RAID group RG2. When the user requests that the capacity of the virtual disk VD1 be expanded, the management server 320 may move the allocation destination of the volume VOL11, for example, from the RAID group RG2 to the RAID group RG3 having a larger empty area.

As described above, the RAID group is a logical storage area implemented by using a plurality of memory devices whose writing is controlled by the RAID technique. A logical address (logical block address: LBA) is assigned to the logical storage area of the RAID group. When data write is requested to a certain logical address on the RAID group, data is written in the plurality of memory devices belonging to the RAID group in accordance with the predetermined RAID level.

In addition to this, in the storage devices 210 and 220 according to the present embodiment, instead of the logical address (virtual address) peculiar to the volume, a logical address same as that of the RAID group is assigned to the volume set in the RAID group. Therefore, one volume is set in a collective area in which logical addresses are consecutive among the logical storage areas of the RAID group. The set volume has an address space same as an address space of the area to which this volume is set among the logical storage areas of the RAID group.

For example, it is assumed that the volume VOL11 is set in the top area in the logical storage area of the RAID group RG1. At this time, when the volume VOL11 is set in the area from the logical address "0" to the logical address "X" in the logical storage area of the RAID group RG1, the logical address at the top of the volume VOL11 is "0", and the logical address at the end of the volume VOL11 is "X".

Further, it is assumed that the volume VOL12 is set immediately after the RAID group RG1. At this time, the logical address at the top of the volume VOL12 is "X+1". The storage device in which such a volume setting method is used may be referred to as a "physical block storage".

By using the volume setting method as described above, it is not required that when accessing data in the volume, the RAID control units 211a and 221a convert a logical address unique to the volume into a logical address of the logical storage area of the RAID group. Therefore, the processing load for data access is reduced, and the access speed may be improved.

Figure 6:
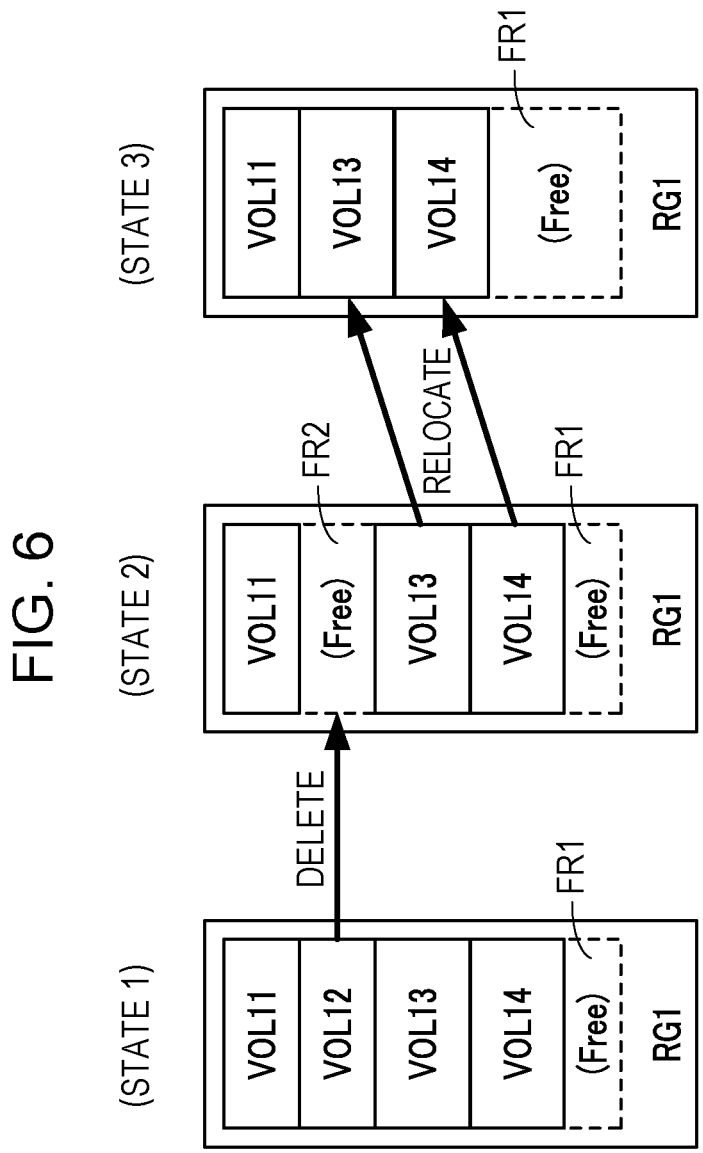
FIG. 6 is a diagram illustrating an example of processing when volumes are deleted.

On the other hand, when volume deletion is performed using the volume setting method as described above, there is a problem as illustrated in FIG. 6 below. FIG. 6 is a diagram illustrating exemplary processing at the time of volume deletion.

In state 1 of FIG. 6, it is assumed that volumes VOL11, VOL12, VOL13, and VOL14 are set in order from the top of the logical storage area of the RAID group RG1. An empty area FR1 is formed at the end side (lower address) relative to the volume VOL14.

From this state 1, it is assumed that the volume VOL12 is deleted. In this case, as illustrated in state 2 of FIG. 6, an empty area FR2 is formed between the volume VOL11 and the volume VOL13. It is assumed that the empty area FR2 is larger than the empty area FR1.

In this state 2, the empty area FR1 and the empty area FR2 exist in the logical storage area of the RAID group RG1. In state 2, for example, it is possible to additionally set, between the volume VOL11 and the volume VOL13, a new volume that is equal to or smaller than the capacity of the empty area FR2. However, in the physical block storage in which the storage area of the volume is not virtualized, it is not possible to additionally set a volume having a capacity larger than the empty area FR2 to the RAID group RG1 in state 2. For example, if a request of adding a volume having a capacity larger than the empty area FR2 is continuously repeated thereafter, the empty area FR2 (and the empty area FR1) remains unused. As described above, in the physical block storage, there is a problem that when a volume is deleted, the utilization efficiency of the storage area may decrease.

Therefore, in the present embodiment, under the control of the management server 320, when an empty area occurs on the top side relative to a certain volume, "relocation" is performed in which the certain volume is relocated toward the top (higher address) so that the empty area is filled. In the example of FIG. 6, when the volume VOL12 is deleted, the volumes VOL13 and VOL14 are relocated to an area adjacent to the volume VOL11 as illustrated in state 3. As a result, the empty area FR2 with low utilization efficiency disappears, and the empty area FR1 on the end side is expanded, so that a larger continuous empty area FR1 is formed, and a large volume may be additionally set, compared with the case of state 2.

In the actual relocation, the data of the volumes VOL13 and VOL14 is evacuated temporarily to another RAID group and then written back to the RAID group RG1. This series of processes, for example, include searching for another RAID group that serves as the evacuation destination, coping data of the volumes VOL13 and VOL14 to the found other RAID group, deleting the original volumes VOL13 and VOL14, coping data of the volumes VOL13 and VOL14 to the RAID group RG1 from the evacuation destination, deleting the volumes VOL13 and VOL14 in the evacuation destination, and the like.

The series of processes are performed while keeping access to the volumes VOL13 and VOL14 from the server devices 110 and 120 as continuous as possible (in the active state). Therefore, the series of processes includes changing the paths to the volumes VOL13 and VOL14 in the evacuation destination and changing the paths to the volumes VOL13 and VOL14 in the RAID group RG1 after relocation.

As described above, complicated processes are required for volume relocation. Therefore, in a case where such a series of processes is performed only by the controller 211 of the storage device 210, the processing load of the controller 211 is large, and the access performance to the volumes in the storage device 210 from the server devices 110 and 120 may deteriorate.

Also, in this cloud infrastructure system, resources of a plurality of server devices and a plurality of storage devices are shared by a plurality of users, so that the usage status of the resources is complicated. In addition to the above, the resource usage status is fluctuating such that an unexpected change in usage status may occur. Therefore, in a case where only the controller 211 of the storage device 210 performs the series of processes, various troubles such as a capacity shortage of the RAID group that serves as the evacuation destination, a communication disconnection, a data destruction, and the like may occur while performing the series of processes. In particular, it may be said that the difficulty of relocating the volumes in the active state is very high.

Therefore, in the present embodiment, the management server 320 that centrally manages the usage status of the cloud infrastructure system generates commands for performing the above-described series of processes and transmits these commands to the storage device 210. The controller 211 of the storage device 210 simply performs the processes in accordance with the received command. As a result, the processing load of the controller 211 may be reduced, and the probability of failure occurrence while performing the volume relocation may be reduced.

Figure 7:
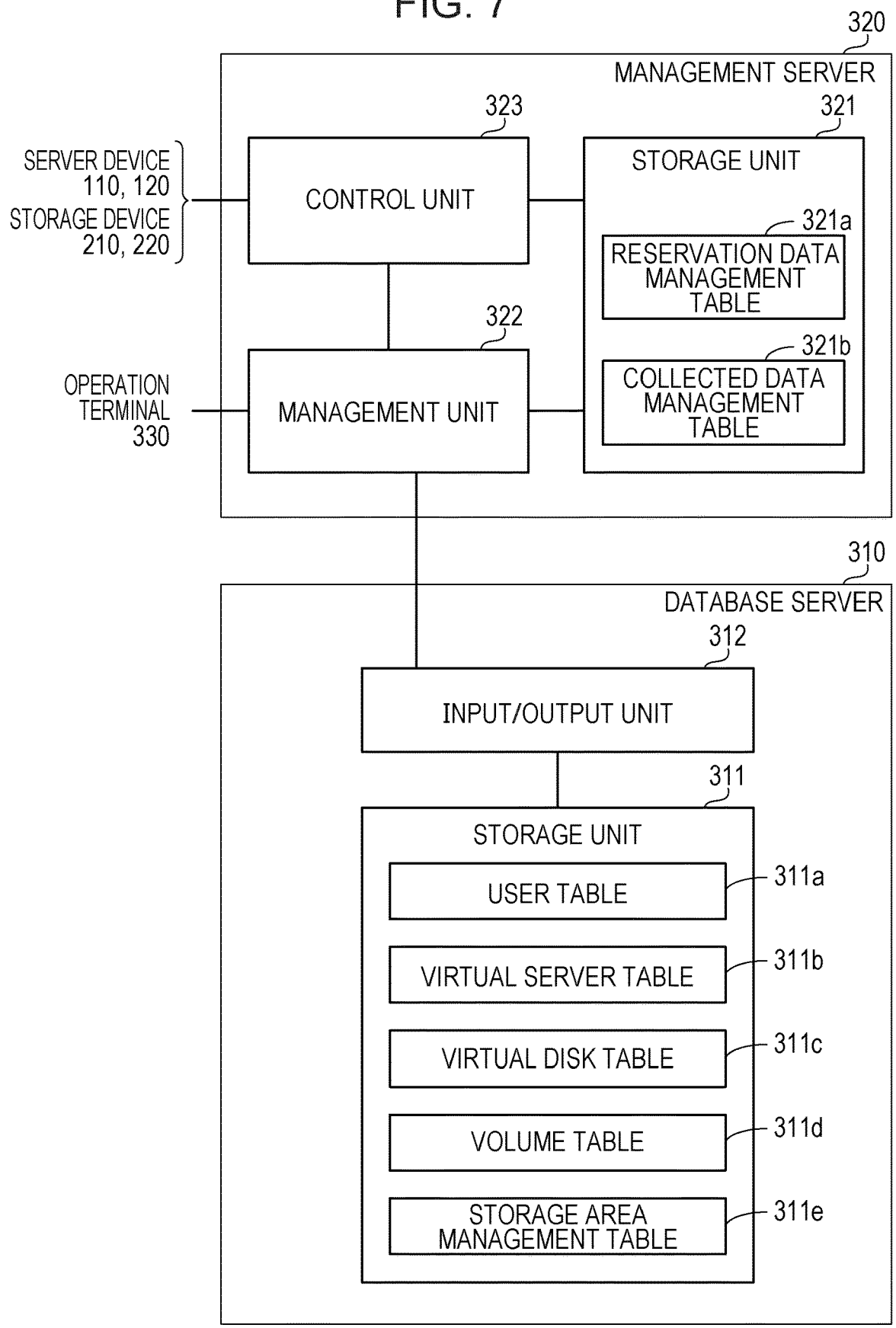
FIG. 7 is a diagram illustrating exemplary functional configurations of a database server and a management server.

FIG. 7 is a diagram illustrating exemplary functional configurations of the database server and the management server. The database server 310 includes a storage unit 311 and an input/output unit 312. The function of the storage unit 311 is implemented by, for example, a storage area of a memory device (not illustrated) included in the database server 310. The storage unit 311 stores therein table information such as a user table 311a, a virtual server table 311b, a virtual disk table 311c, a volume table 311d, and a storage area management table 311e. The table information will be described below with reference to FIGS. 8 to 12.

FIG. 8 is a diagram illustrating an exemplary configuration of the user table 311a. The user table 311a is a management table for managing user information. In the user table 311a, an item of a user name and an item of a user ID (identification) are registered in association with each other. The user name indicates a name of a user, such as a company name. The user ID identifies the user.

FIG. 9 is a diagram illustrating an exemplary configuration of the virtual server table 311b. The virtual server table 311b is a management table for managing information on a virtual server (virtual machine) used by a user. The virtual server table 311b has items of a user name, a host name, a virtual server name, a physical server name, a cluster group, a type, a machine type, and an OS type.

The user name indicates a name of a user who uses a virtual server. The host name indicates a name of a host corresponding to the virtual server. The virtual server name indicates a name for identifying the virtual server (virtual machine). The physical server name indicates a name for identifying a server device (server devices 110 and 120) on which the virtual server operates. The cluster group indicates information for identifying a cluster group to which the virtual server belongs.

The type indicates a type of the virtual server. For example, in a case where the virtual server is operated independently, "1" is registered as the type. In a case where the virtual server is operated redundantly with another virtual server (for example, one is operated as the other's spare machine), "redundant" is registered as the type. The machine type indicates information for identifying specifications such as performance and configuration of the virtual machine. The OS type indicates information for identifying an OS program executed in the virtual machine.

FIG. 10 is a diagram illustrating an exemplary configuration of the virtual disk table 311c. The virtual disk table 311c is a management table for managing information on a virtual disk coupled to a virtual server (virtual machine). The virtual disk table 311c has items of a virtual server name, a LUN (logical unit number) number, a virtual disk ID, a volume name, and a disk type.

The virtual server name indicates a name for identifying a virtual server to which a virtual disk is coupled. The LUN number indicates information for identifying a volume corresponding to the virtual disk. The virtual disk ID indicates information for identifying the virtual disk. The volume name indicates information for identifying a volume corresponding to the virtual disk. For example, while the LUN number is used by the user to identify a volume, the volume name is used by the cloud infrastructure system to identify a volume. The disk type indicates information on a specification of the virtual disk. For example, in a case where a virtual disk is coupled to a single virtual server, "single" is registered as the disk type, and in a case where the virtual disk is coupled to a plurality of virtual servers and shared among them, "shared" is registered.

FIG. 11 is a diagram illustrating an exemplary configuration of the volume table 311d. The volume table 311d is a management table for managing information on volumes set in a RAID group. The volume table 311d has items of a storage device name, a RAID group name, a volume number, a volume name, and a size.

The storage device name indicates a name for identifying a storage device (storage devices 210 and 220) in which a volume is set. The RAID group name indicates a name for identifying a RAID group in which the volume is set. The volume number indicates an identification number of the volume. The volume name indicates a name for identifying the volume. The size indicates a capacity of the volume.

FIG. 12 is a diagram illustrating an exemplary configuration of the storage area management table 311e. The storage area management table 311e is a management table for managing the usage status of the storage areas of the storage units 212 and 222 of the storage devices 210 and 220. The storage area management table 311e has items of a storage device name, a RAID group name, a RAID size, a volume name, a size, and a status.

The storage device name indicates a name for identifying a storage device (storage devices 210 and 220) in which a RAID group is set. The RAID group name indicates a name for identifying the set RAID group. The RAID size indicates a total capacity of a logical storage area of the RAID group. The volume name indicates a name for identifying a volume set in the RAID group. The size indicates a capacity of the volume set in the RAID group.

The status indicates a state of a corresponding area in the logical storage area of the RAID group. For example, in a case where an area is being used as a volume, "Used" is registered as the status thereof. In a case where an area is reserved for use as a volume, "Reserved" is registered as the status. A storage area whose status is "Reserved" is recognized as not being an empty area even in an unused state, so that it is not erroneously used as an evacuation destination of a volume or the like. In a case where the status is "Free", no information is registered in each item of the volume name and the size.

With the above-described storage area management table 311e, what kind of volume is set in the RAID group and how much empty area is available is managed. In the example of FIG. 12, a volume "vd-1101" of 300 gigabytes and a volume "vd-1102" of 120 gigabytes are set in a RAID group "RG000" in order from the highest address. An area at a lower address in the RAID group "RG000" is an empty area.

Hereinafter, the description will be continued returning to FIG. 7. The process of the input/output unit 312 is implemented, for example, by a processor (not illustrated) included in the database server 310 that executes a predetermined program. In response to a request from the management server 320, the input/output unit 312 registers data on the table information in the storage unit 311 and reads data from the table information.

Next, the management server 320 includes a storage unit 321, a management unit 322, and a control unit 323. The function of the storage unit 321 is implemented by a storage area of a memory device included in the management server 320, such as the RAM 320b and the HDD 320c. The processes of the management unit 322 and the control unit 323 are implemented, for example, by the processor 320a that executes a predetermined program.

The storage unit 321 stores therein a reservation data management table 321a and a collected data management table 321b. FIG. 13 is a diagram illustrating an exemplary configuration of the reservation data management table 321a. The reservation data management table 321a is a management table for managing information related to a volume operation reservation.

A volume operation reservation occurs when a user requests a process that requires manipulation of a volume, such as addition or deletion of a virtual disk or specification change of a virtual disk. When a volume operation reservation occurs, corresponding reservation data is generated. An example of the specification change of the virtual disk includes a change in access speed of a virtual disk, and in this case, the corresponding volume is migrated, for example, to a RAID group implemented by a memory device with higher access speed.

One record of the reservation data management table 321a indicates reservation data on one volume operation reservation. The reservation data includes items of user information, a virtual server name, a physical server name, an operation type, and a volume number.

The user information includes a user name and a user ID. The user name indicates a name of a user who reserves the volume operation, and the user ID indicates an identification number for identifying the user. The virtual server name indicates a name for identifying a virtual server (virtual machine) to be coupled to a virtual disk associated with a volume to be operated. The physical server name indicates a name for identifying a server device (server devices 110 and 120) on which the virtual server operates. The operation type indicates a type of an operation content. Examples of the operation type include deletion of a volume, addition of a volume, migration of a volume, and the like. Although not illustrated, for example, in a case where a volume is migrated in response to a request for a specification change of a virtual disk, information indicating the changed specification is registered in the reservation data. The volume number indicates an identification number for identifying a volume to be operated.

Returning to FIG. 7, the management unit 322 accepts from the operation terminal 330 a request for addition or deletion of a virtual disk and for a specification change of a virtual disk. Upon receiving a request for a process in which an operation of a volume is required, the management unit 322 generates reservation data to perform the volume operation reservation. Every time the volume operation reservation occurs, the management unit 322 registers reservation data corresponding to the volume operation reservation in the reservation data management table 321a.

In addition, the management unit 322 reads reservation data from the reservation data management table 321a in order of registration, and collects information on a volume to be operated from the database server 310 based on the read reservation data. The management unit 322 combines the data collected from the database server 310 as collected data and registers the collected data in the collected data management table 321b.

FIG. 14 is a diagram illustrating an exemplary configuration of the collected data management table 321b. The collected data management table 321b is a management table for temporarily holding the collected data. One record of the collected data management table 321b indicates collected data on one volume operation reservation. The collected data includes a storage device name, a LUN number, and volume information in addition to user information, a virtual server name, a physical server name, an operation type, and a volume number, which are included in the reservation data. The volume number included in the reservation data is stored in the volume information.

The storage device name indicates a name for identifying a storage device (storage devices 210 and 220) in which a volume to be operated is set. The LUN number indicates a number for identifying the volume to be operated. The RAID group name indicates a name for identifying a RAID group in which the volume to be operated is set. The volume name indicates a name for identifying the volume to be operated. The size indicates a capacity of the volume to be operated. The disk type indicates information on a specification of a virtual disk corresponding to the volume to be operated. The status indicates a state of the volume to be operated.

Returning to FIG. 7, the management unit 322 generates control information for performing the volume operation corresponding to the collected data. For example, in a case where volume deletion accompanied by relocation of a volume is performed, control information including a volume to be deleted, a volume to be relocated, a RAID group name indicating a RAID group that serves as an evacuation destination of the volume to be relocated, and the like is generated. The management unit 322 transfers the generated control information to the control unit 323.

Based on the control information transferred from the management unit 322, the control unit 323 generates a command for performing the volume operation, and generates command information describing the generated command. The control unit 323 transmits the generated command information to a storage device in which the volume to be operated is set, and causes the storage device to perform the volume operation based on the command information. Upon receiving from the storage device a notification of completing the volume operation based on the command information, the control unit 323 requests the management unit 322 to update the management table in conformity to the volume operation.

In response to this request, the management unit 322 reflects the change in the resource usage status in response to the volume operation in the management table registered in the database server 310. The management unit 322 deletes the reservation data and collected data corresponding to the completed volume operation from the reservation data management table 321a and the collected data management table 321b, respectively.

Next, with reference to FIGS. 15 to 17, exemplary processing of the volume deletion accompanied by the volume relocation will be described.

Figure 15:
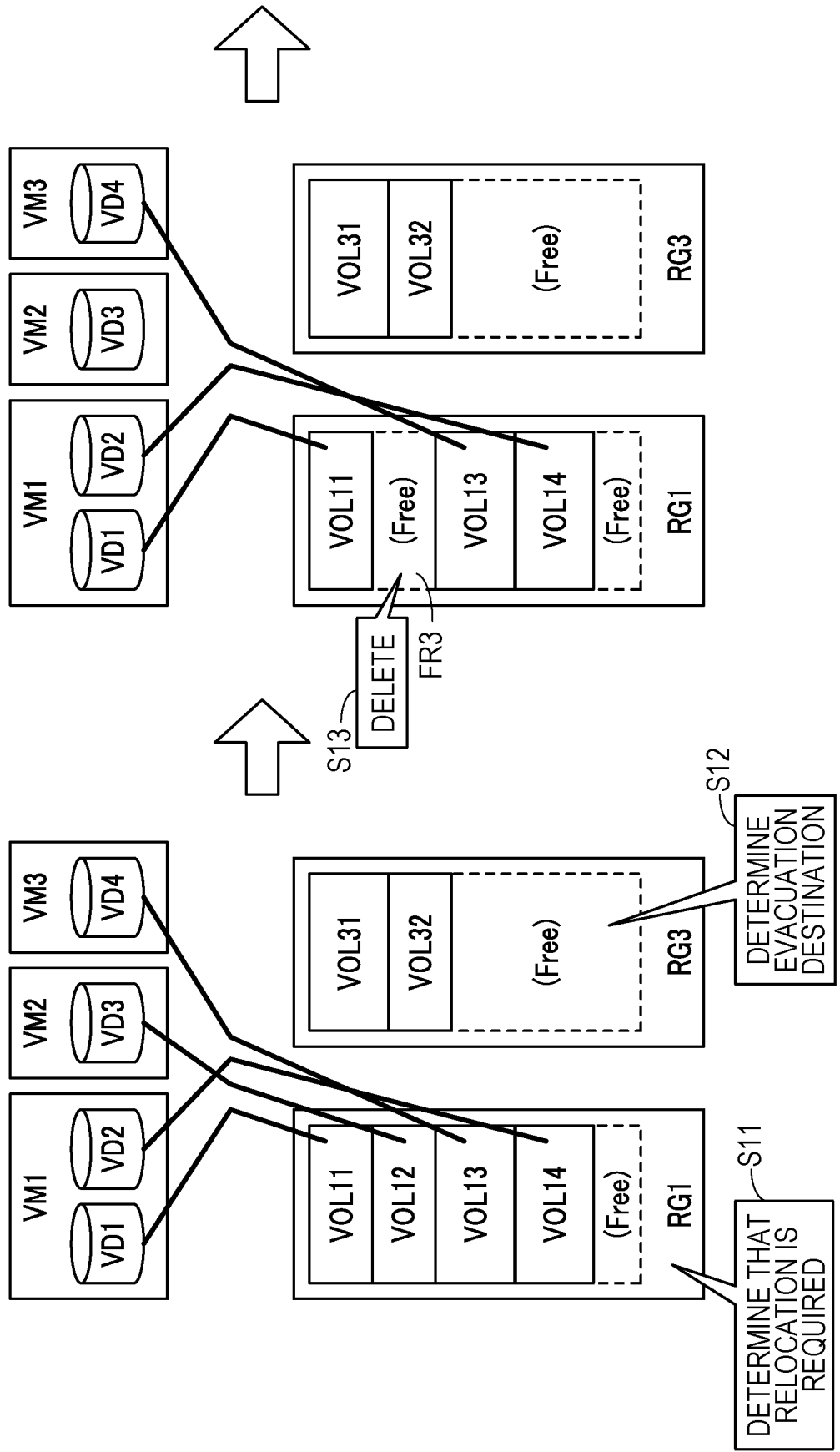
FIG. 15 is a diagram (part 1) illustrating exemplary processing of a volume deletion and a volume relocation.
Figure 16:
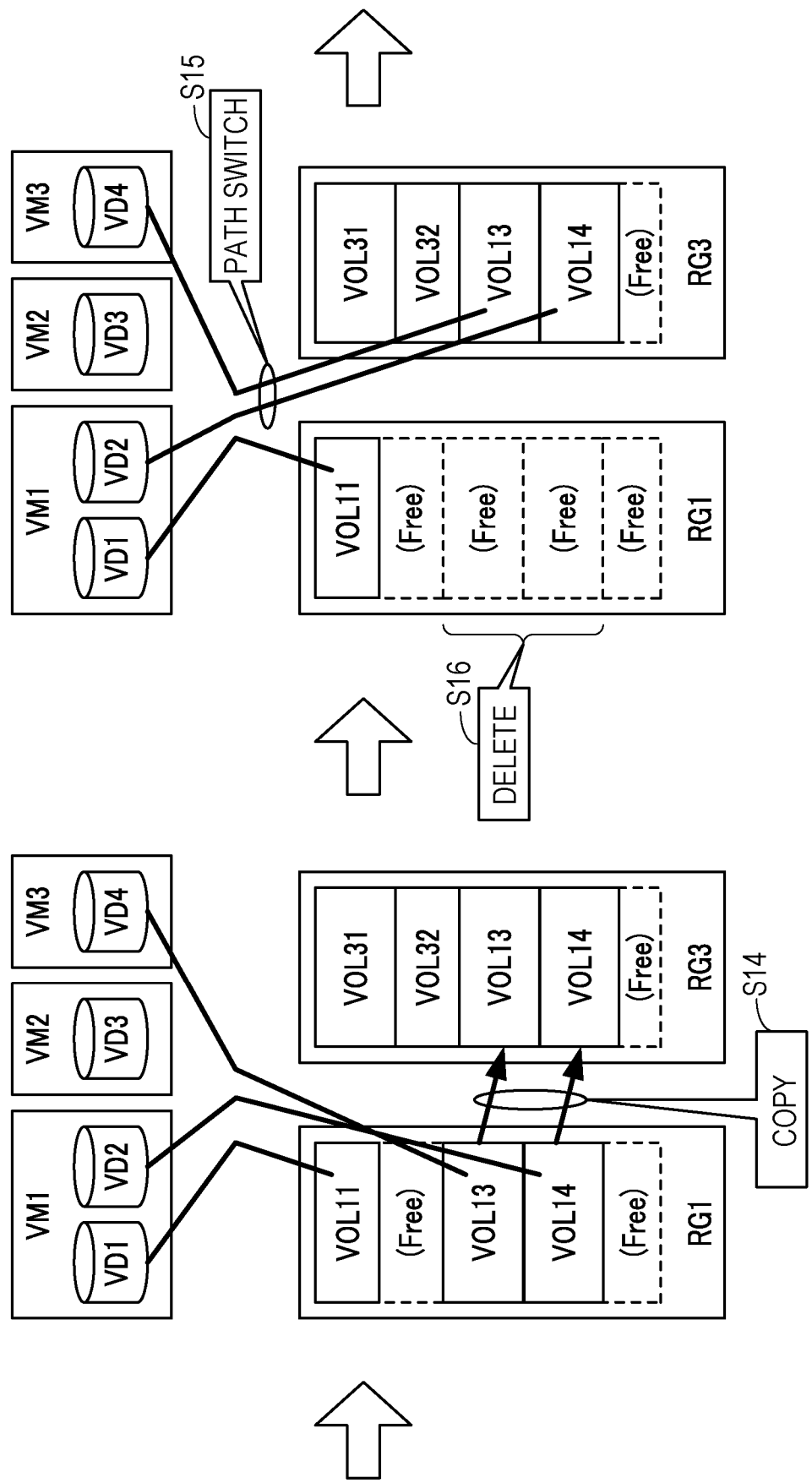
FIG. 16 is a diagram (part 2) illustrating exemplary processing of a volume deletion and a volume relocation.
Figure 17:
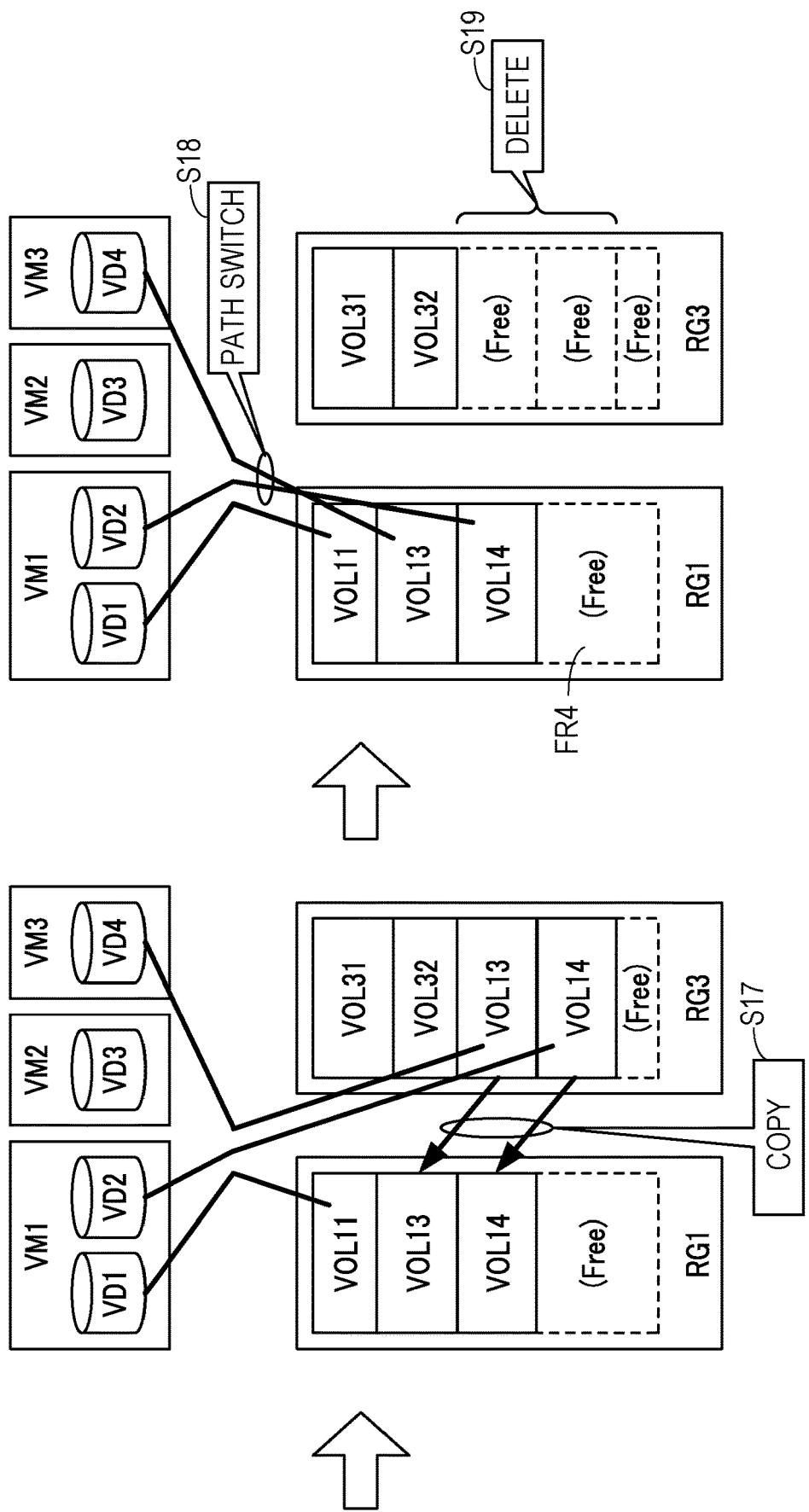
FIG. 17 is a diagram (part 3) illustrating exemplary processing of a volume deletion and a volume relocation.

FIGS. 15 to 17 are diagrams illustrating exemplary processing of the volume deletion and the volume relocation. FIGS. 15 to 17 illustrate processes performed when a volume operation for deleting the volume VOL12 is requested from the state illustrated in FIG. 5.

When a volume operation for deleting the volume VOL12 is requested, the management unit 322 of the management server 320 determines whether another volume is set at an address lower than an address of the volume VOL12 in the logical storage area of the RAID group RG1. When it is determined that the volumes VOL13 and VOL14 are set at the lower addresses, the management unit 322 determines that relocation of these volumes VOL13 and VOL14 is required (step S11).

The management unit 322 determines an evacuation destination of the volumes VOL13 and VOL14 from among the RAID groups RG1 to RG6 set in the storage devices 210 and 220 (step S12). In this process, a RAID group having a continuous empty area equal to or larger than a total capacity of the volumes VOL13 and VOL14 is determined as the evacuation destination from among the RAID groups RG1 to RG6. As an example in FIG. 15, it is assumed that the RAID group RG3 set in the storage device 210, which also includes the RAID group RG1, is determined as the evacuation destination. An evacuation destination of the volume VOL13 and an evacuation destination of the volume VOL14 may be determined to be assigned to different RAID groups.

Next, the management unit 322 generates control information for performing the deletion of the volume VOL12 and the relocation of the volumes VOL13 and VOL14, and transfers the control information to the control unit 323. The control unit 323 generates command information for performing the process, and transmits the generated command information to the controller 211 of the storage device 210 to request to perform the process based on the command information.

The RAID control unit 211a of the controller 211 performs the following process based on the received command information. First, the RAID control unit 211a deletes the volume VOL12 (step S13). At this time, an empty area FR3 is formed between the volume VOL11 and the volume VOL13 in the RAID group RG1. Next, the RAID control unit 211a copies (mirrors) the volumes VOL13 and VOL14 to an empty area of the RAID group RG3 that serves as the evacuation destination (step S14).

In this copy process, copying the volumes VOL13 and VOL14 is performed while maintaining a state (active state) where access by the virtual machines VM3 and VM1 to the volumes VOL13 and VOL14 in the RAID group RG1 is permitted. For example, the RAID control unit 211a generates bitmaps corresponding to the respective volumes VOL13 and VOL14. Each bitmap has a bit for each logical block on the volumes VOL13 and VOL14, and every bit is set to have a value of "1" in the initial state.

A copy process of copying the volume VOL13 is performed, for example, as follows using the corresponding bitmap. The RAID control unit 211a copies data of a logical block in the volume VOL13, whose bit value is "1", to the evacuation destination and updates the value of the bit to "0" when the copy of the data is completed. Along with this, when requested from the virtual machine VM3 to write data to the volume VOL13, the RAID control unit 211a writes the data to the volume VOL13 and updates a value of a bit corresponding to a logical block as a write destination to "1". The RAID control unit 211a continues the processes of copying data to the evacuation destination and accepting a write request from the virtual machine VM3 until every bit of the bitmap has a value of "0". When every bit of the bitmap has a value of "0", the copy process ends. For the volume VOL14, the same process is performed using a corresponding bitmap.

Upon completion of the copy process to the evacuation destination, the RAID control unit 211a switches a connection path from the virtual machine VM3 to the volume VOL13 in the RAID group RG1 to a connection path from the virtual machine VM3 to the volume VOL13 in the RAID group RG3. The RAID control unit 211a switches a connection path from the virtual machine VM1 to the volume VOL14 in the RAID group RG1 to a connection path from the virtual machine VM1 to the volume VOL14 in the RAID group RG3 (step S15).

Upon completion of the path switching, the RAID control unit 211a starts accepting accesses to the volumes VOL13 and VOL14 in the RAID group RG3. As a result, subsequent accesses from the virtual machines VM3 and VM1 to the volumes VOL13 and VOL14 are made to the volumes VOL13 and VOL14 in the evacuation destination.

Due to the path switching in step S15, the volumes as the access destination corresponding to the virtual disks VD4 and VD2 are switched to the volumes VOL13 and VOL14 in the RAID group RG3. Therefore, upon receiving an access request designating an address on the virtual disk VD4, the RAID control unit 211a converts the designated address to a logical address of the volume VOL13 in the RAID group RG3 instead of a logical address of the volume VOL13 in the RAID group RG1. Similarly, upon receiving an access request designating an address on the virtual disk VD2, the RAID control unit 211a converts the designated address to a logical address of the volume VOL14 in the RAID group RG3 instead of a logical address of the volume VOL14 in the RAID group RG1.

After completion of the path switching, the RAID control unit 211a blocks the connection paths from the virtual machines VM3 and VM1 to the respective volumes VOL13 and VOL14 in the RAID group RG1. The RAID control unit 211a deletes the volumes VOL13 and VOL14 in the RAID group RG1 (step S16).

Next, the RAID control unit 211a copies (mirrors) the volumes VOL13 and VOL14 in the RAID group RG3 to a position following the volume VOL11 in the RAID group RG1 (step S17). In this copy process, as in the above-described process of step S14, the copy is performed while maintaining a state (active state) where access by the virtual machines VM3 and VM1 to the volumes VOL13 and VOL14 in the RAID group RG3 is permitted.

Upon completion of the copy process, the RAID control unit 211a switches the connection path from the virtual machine VM3 to the volume VOL13 in the RAID group RG3 to a connection path from the virtual machine VM3 to the volume VOL13 in the RAID group RG1. The RAID control unit 211a switches the connection path from the virtual machine VM1 to the volume VOL14 in the RAID group RG3 to a connection path from the virtual machine VM1 to the volume VOL14 in the RAID group RG1 (step S18).

Upon completion of the path switching, the RAID control unit 211a starts accepting accesses to the volumes VOL13 and VOL14 in the RAID group RG1. At this time, upon receiving an access request designating an address on the virtual disk VD4, the RAID control unit 211a converts the designated address to a logical address of the volume VOL13 in the RAID group RG1 instead of a logical address of the volume VOL13 in the RAID group RG3. Similarly, upon receiving an access request designating an address on the virtual disk VD2, the RAID control unit 211a converts the designated address to a logical address of the volume VOL14 in the RAID group RG1 instead of a logical address of the volume VOL14 in the RAID group RG3. As a result, subsequent accesses from the virtual machines VM3 and VM1 to the volumes VOL13 and VOL14 are made to the volumes VOL13 and VOL14 in the RAID group RG1.

After completion of the path switching, the RAID control unit 211a blocks the connection paths from the virtual machines VM3 and VM1 to the respective volumes VOL13 and VOL14 in the RAID group RG3. The RAID control unit 211a deletes the volumes VOL13 and VOL14 in the RAID group RG3 (step S19).

As a result of the above-described process, a continuous empty area FR4 larger than the empty area FR3 illustrated in FIG. 15 is formed in the RAID group RG1. This makes it possible to newly set a volume larger than the empty area FR3 in the RAID group RG1, and as a result, the utilization efficiency of the storage area corresponding to the RAID group RG1 is improved.

In the above-described process, accesses to the volumes VOL13 and VOL14 are continuously accepted from the virtual machines VM3 and VM1, respectively, except during the path switching process. Therefore, the period during which the volumes VOL13 and VOL14 are unable to be accessed due to the relocation process is minimized, and the influence of the relocation process on the operation of the virtual machines VM3 and VM1 may be reduced.

Upon completion of the above-described process, the RAID control unit 211a transmits a completion notification to the management server 320. In the management server 320, when the completion notification is received by the control unit 323, the management unit 322 reflects the change in the resource usage status in response to the volume operation in the management table registered in the database server 310.

Specifically, the management unit 322 deletes a record in which the volume VOL12 is registered from the virtual disk table 311c, the volume table 311d, and the storage area management table 311e. Records corresponding to the respective volumes VOL11, VOL13, and VOL14 are sequentially registered in the RAID group RG1 by deleting the record in which the volume VOL12 is registered from in the storage area management table 311e. As a result, it is indicated that there is no empty area between the volume VOL11 and the volume VOL13, so that it is sufficient to only delete the record in which the volume VOL12 is registered from the storage area management table 311e.

As described above, in the present embodiment, allocation of volumes to a RAID group is performed in conformity to a rule in which the volumes are allocated in order from the top of a logical storage area of the RAID group without an empty area between the volumes. FIGS. 15 to 17 also illustrate exemplary processing in which this rule is applied. However, as another method, a different rule may be applied in which volumes are allocated in order from the end of the logical storage area of the RAID group without an empty area between the volumes.

In a case where the latter method is used, when deletion of the volume VOL12 is requested in step S11 of FIG. 15, the management unit 322 determines whether another volume is set at an address higher than an address of the volume VOL12. When the other volume is set at the higher address, the management unit 322 determines that relocation of the other volume is required. In the example of FIG. 15, the volume VOL11 is a target of the relocation.

In the relocation process thereafter, when the evacuated volumes are written back to the RAID group RG1 as illustrated in step S17 of FIG. 17, the data of the volumes is written such that the data of the volumes starts from the end of the logical storage in the RAID group instead of from the top of the logical storage area in the RAID group. As a result, the empty area on the top side in the logical storage area of the RAID group is expanded.

Figure 18:
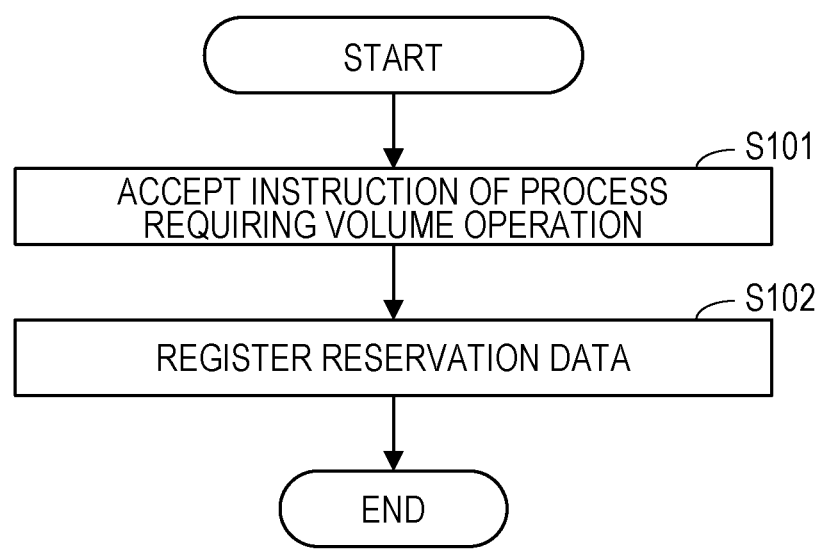
FIG. 18 is a flowchart illustrating an exemplary procedure of accepting a volume operation instruction.

Next, the process of the management server will be described with reference to the flowcharts of FIGS. 18 to 23. FIG. 18 is a flowchart illustrating an exemplary procedure of accepting a volume operation instruction.

[step S101] The management unit 322 accepts, from the operation terminal 330, an instruction of a process that requires an operation of a volume, such as addition or deletion of a virtual disk, a specification change of a virtual disk, and the like. At this time, the management unit 322 accepts a virtual disk ID indicating a virtual disk which is to be added or deleted, or whose usage is to be changed, along with a user name of a request source. The management unit 322 inquires of the database server 310 about a volume number of a volume associated with the accepted virtual disk ID, a virtual server name indicating a virtual server (virtual machine) to which a virtual disk indicated by the virtual disk ID is coupled, and a physical server name indicating a server device on which the virtual server operates. In response to the inquiry, the input/output unit 312 of the database server 310 refers to the user table 311a, the virtual server table 311b, and the virtual disk table 311c, extracts the above-described information, and returns the extracted information to the management server 320.

[step S102] Based on the accepted virtual disk ID, the accepted user name, and the information returned from the database server 310, the management unit 322 generates reservation data indicating volume operation reservation corresponding to the instructed processing content, and registers the generated reservation data in the reservation data management table 321a.

The management unit 322 registers the reservation data in the reservation data management table 321a by the above-described procedure of FIG. 18. In parallel with this registration process, the management unit 322 reads already registered reservation data from the reservation data management table 321a in the registration order, and performs a process conformable to the reservation data. The following FIGS. 19 to 23 illustrate an exemplary process when the management unit 322 reads, from the reservation data management table 321a, reservation data instructing the volume deletion.

FIGS. 19 to 23 are flowcharts illustrating an exemplary procedure of the volume deletion process.

[step S111] The management unit 322 reads, from the reservation data management table 321a, reservation data that instructs volume deletion.

[step S112] Based on the read reservation data, the management unit 322 collects, from the database server 310, information on a volume to be operated. The management unit 322 combines data collected from the database server 310 as collected data and registers the collected data in the collected data management table 321b.

Subsequently, the management unit 322 performs process of checking a setting status of the volume (steps S113, S114, and S116).

[step S113] The management unit 322 inquires of the database server 310 about the setting status of the volume in a RAID group in which the volume to be deleted is set. The input/output unit 312 of the database server 310 refers to the storage area management table 311e and returns the setting status of the volume in the RAID group to the management server 320.

Based on the information returned from the database server 310, the management unit 322 determines whether another volume is set at an address lower than an address of the volume to be deleted in the RAID group in which the volume is set. In a case where another volume is set at a lower address, the management unit 322 performs the process of step S114. In this case, it is determined that relocation is required for the volume set at the lower address. On the other hand, in a case where no volume is set at a lower address, the management unit 322 performs the process of step S141 in FIG. 22. In this case, volume relocation is not required, and only the deletion process of the volume to be deleted is performed.

[step S114] The management unit 322 inquires of the database server 310 about an empty area in each RAID group in the storage device same as the storage device in which the volume to be deleted is set. The input/output unit 312 of the database server 310 refers to the storage area management table 311e and returns information on an empty area in each RAID group in the storage device to the management server 320.

Based on the information returned from the database server 310, the management unit 322 determines whether there is an empty area that may serve as an evacuation destination in the RAID group in the storage device. An empty area that may serve as an evacuation destination is a continuous empty area equal to or larger than the capacity of the volume to be relocated. The management unit 322 performs the process of step S115 in a case where there is such an empty area, and performs the process of step S116 in a case where there is no such empty area.

[step S115] The management unit 322 determines, as the evacuation destination of the volume to be relocated, the RAID group in the storage device same as the storage device in which the volume to be deleted is set. At this time, the management unit 322 determines the RAID group that serves as the evacuation destination and the evacuation destination area in the RAID group. The evacuation destination area has the same size as the volume to be relocated. In a case where there is a plurality of volumes to be relocated, the evacuation destination area is an area having the total size of them.

The management unit 322 requests the database server 310 to reserve the evacuation destination area in the RAID group that serves as the evacuation destination. In response to this request, the input/output unit 312 of the database server 310 accesses the storage area management table 311e and sets the status of the evacuation destination area to "Reserved". As a result, the evacuation destination area is not erroneously used for other uses until the relocation of the volume is completed, and the relocation may be performed without fail. Thereafter, the process proceeds to step S121 in FIG. 20.

[step S116] The management unit 322 inquires of the database server 310 about an empty area in each RAID group in another storage device. Another storage device is a storage device other than the storage device in which the volume to be deleted is set. The input/output unit 312 of the database server 310 refers to the storage area management table 311e and returns information on an empty area in each RAID group in the storage device to the management server 320.

Based on the information returned from the database server 310, the management unit 322 determines whether there is an empty area that may serve as an evacuation destination in the RAID groups in another storage device. As in the above-described case, an empty area that may serve as an evacuation destination is a continuous empty area equal to or larger than the capacity of the volume to be relocated. The management unit 322 performs the process of step S117 in a case where there is such an empty area, and performs the process of step S141 of FIG. 22 in a case where there is no such empty area. In the latter case, since it is impossible to evacuate the volume to be relocated, the volume relocation is not performed, and only the deletion process of the volume to be deleted is performed.

[step S117] The management unit 322 determines the RAID group in the other storage device as the evacuation destination of the volume to be relocated. At this time, the management unit 322 determines the storage device, the RAID group that serves as the evacuation destination, and the evacuation destination area in the RAID group.

As in step S115, the management unit 322 requests the database server 310 to reserve the evacuation destination area in the RAID group that serves as the evacuation destination. In response to this request, the input/output unit 312 of the database server 310 accesses the storage area management table 311e and sets the status of the evacuation destination area to "Reserved". As a result, the evacuation destination area is not erroneously used for other uses until the relocation of the volume is completed, and the relocation may be performed without fail. Thereafter, the process proceeds to step S121 in FIG. 20.

Figure 19:
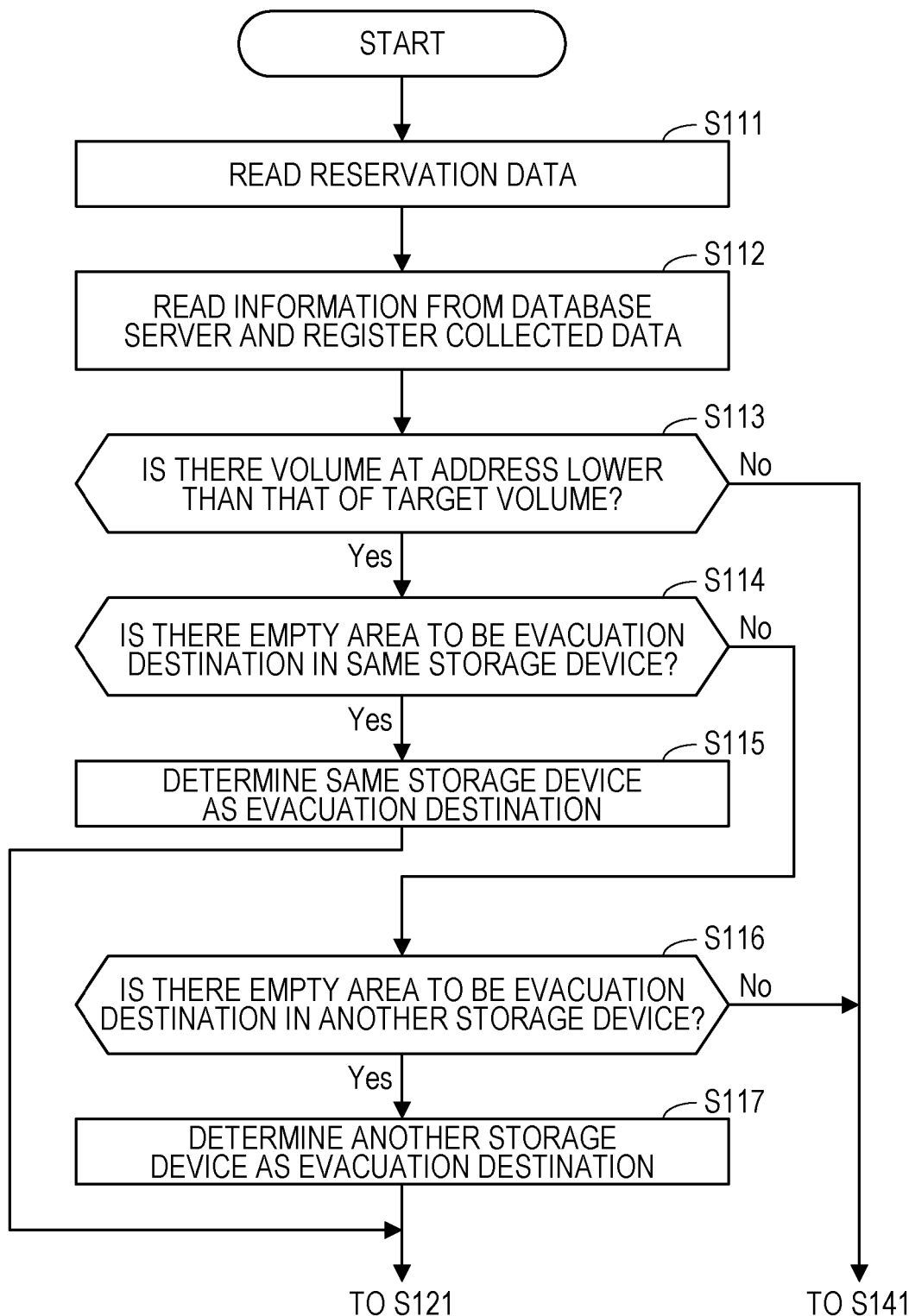
FIG. 19 is a flowchart (part 1) illustrating an exemplary procedure of a volume deletion process.

In the above-described process of FIG. 19, when it is determined that there is an empty area that may serve as an evacuation destination of the volume in step S114 or step S116, it is determined that relocation of the volume is possible. In this case, according to the procedure illustrated in FIG. 20, the management unit 322 next generates control information for performing the volume operation (volume deletion and volume relocation) corresponding to the collected data registered in step S112.

The description will be continued below with reference to FIG. 20.

[step S121] Based on the collected data, the management unit 322 designates, in the control information, a storage device name indicating a storage device in which the volume to be operated (the volume to be deleted and relocated) is set.

[step S122] Based on the collected data, the management unit 322 designates, in the control information, a RAID group name indicating a RAID group in which the volume to be operated is set.

[step S123] Based on the collected data, the management unit 322 designates, in the control information, a volume name indicating the volume to be deleted.

[step S124] The management unit 322 designates, in the control information, a volume name indicating a volume to be relocated. The volume to be relocated is a volume that is determined to be set at an address lower than an address of the volume to be deleted in step S113 of FIG. 19.

[step S125] The management unit 322 designates, in the control information, a RAID group name indicating a RAID group that serves as an evacuation destination of the volume to be relocated. The RAID group that serves as an evacuation destination is the RAID group determined in step S115 or step S117 in FIG. 19.

Figure 21:
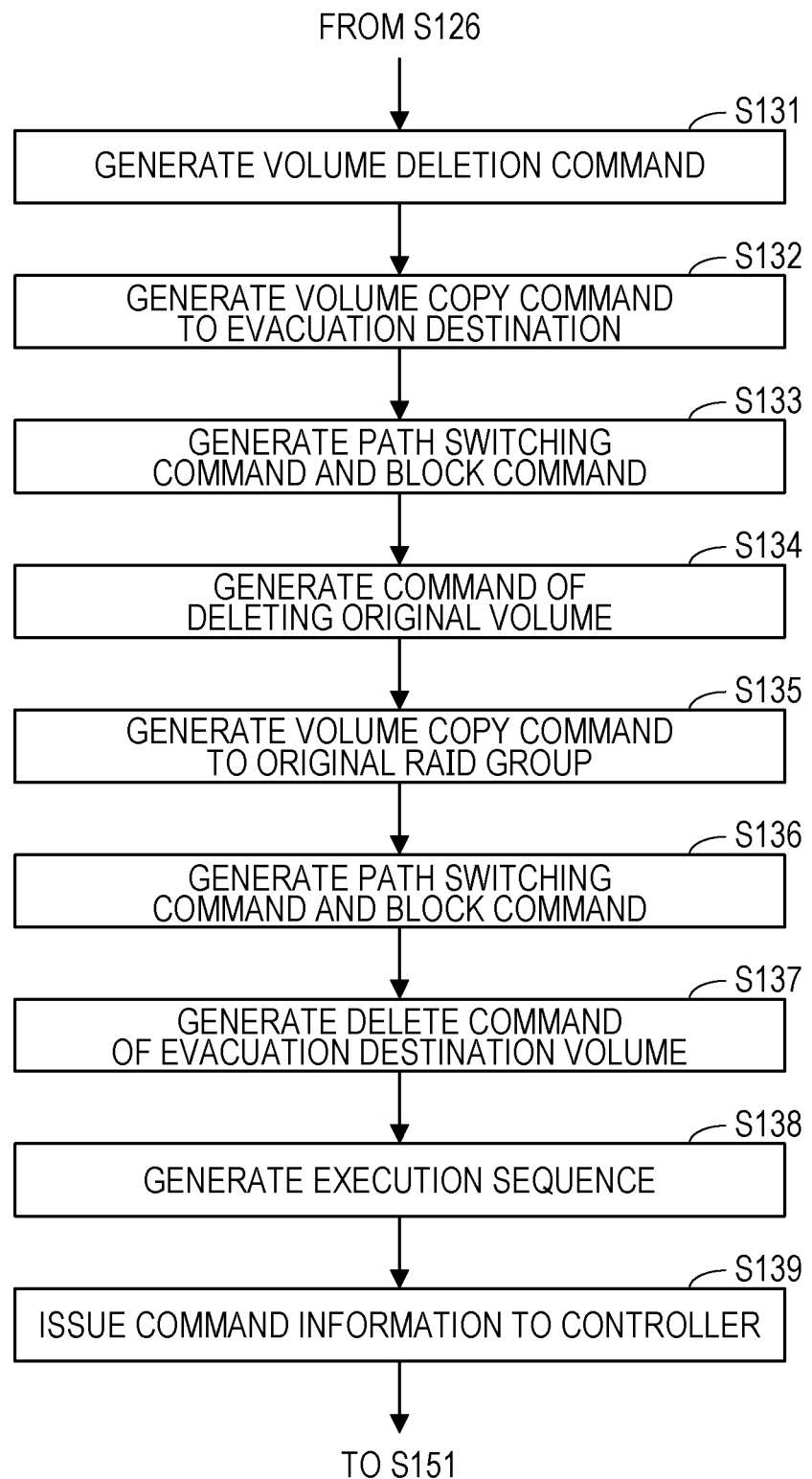
FIG. 21 is a flowchart (part 3) illustrating an exemplary procedure of a volume deletion process.

[step S126] The management unit 322 transfers the generated control information to the control unit 323. Thereafter, the process of step S131 in FIG. 21 is performed. The description will be continued below with reference to FIG. 21. First, in steps S131 to S138 in FIG. 21, command information for performing deletion of a volume and relocation of a volume is generated based on the control information.

[step S131] Based on the control information, the control unit 323 generates a deletion command for deleting the volume to be deleted.

[step S132] Based on the control information, the control unit 323 generates a volume copy command for copying the volume to be relocated to the evacuation destination area. Hereinafter, the volume generated in the evacuation destination area by this command is referred to as an "evacuation destination volume".

[step S133] Based on the control information, the control unit 323 generates a path switching command for switching a path for accessing the volume to be relocated in the original RAID group to a path to the evacuation destination volume, and a path blocking command for blocking the path to the volume before the switching. The storage device in which the evacuation destination volume is set may be different from the storage device in which the copy source volume is set. In this case, the path switching command also includes a command for switching an access path from a server device on which a virtual machine of an access source to the volume operates to the storage device in which the evacuation destination volume is set.

[step S134] Based on the control information, the control unit 323 generates a deletion command for deleting the copy source volume.

[step S135] Based on the control information, the control unit 323 generates a volume copy command for copying (writing back) the evacuation destination volume to an empty area in the original RAID group such that the evacuation destination volume starts from the highest address of the empty area. Hereinafter, the volume generated in the copy destination area in the original RAID group by this command is referred to as a "relocation destination volume".

[step S136] Based on the control information, the control unit 323 generates a path switching command for switching the path for accessing the evacuation destination volume to a path to the relocation destination volume and a path blocking command for blocking the path to the evacuation destination volume. The storage device in which the relocation destination volume is set may be different from the storage device in which the evacuation destination volume is set. In this case, the path switching command also includes a command for switching the access path from the server device on which the virtual machine of the access source to the volume operates to the storage device in which the relocation destination volume is set.

[step S137] Based on the control information, the control unit 323 generates a deletion command for deleting the evacuation destination volume.

[step S138] The control unit 323 generates an execution sequence of the commands generated in steps S131 to S137, and generates command information described so that each command is performed in accordance with the execution sequence.

[step S139] The control unit 323 issues (transmits) the generated command information to the controller of the storage device in which the volume to be deleted and the volume to be relocated are set. Thereafter, the process proceeds to step S151 in FIG. 23.

The RAID control unit (one of the RAID control units 211a and 221a) of the controller that has received the command information performs the process of deleting a volume and relocating a volume in accordance with the received command information. For example, in accordance with the command information, the RAID control unit deletes the volume to be deleted, copies the volume to be relocated to the evacuation destination area, switches and blocks the path, deletes the copy source volume, copies (write back) the evacuation destination volume to the original RAID group, switches and blocks the path, and delete the evacuation destination volume. Upon completion of the process, the RAID control unit transmits a completion notification to the management server 320.

Figure 22:
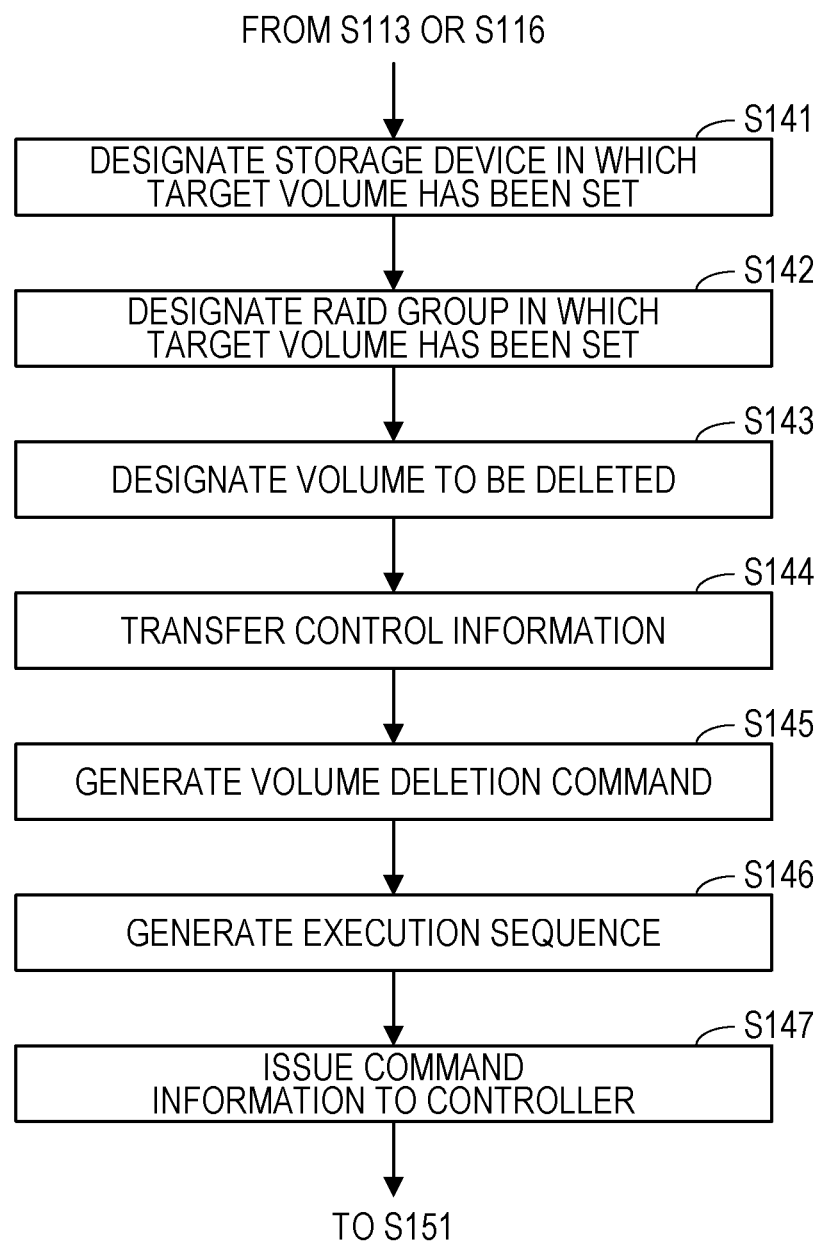
FIG. 22 is a flowchart (part 4) illustrating an exemplary procedure of a volume deletion process.

Next, the description will be continued with reference to FIG. 22. the process illustrated in FIG. 22 is performed in a case where it is determined that it is not required to relocate the volume in step S113 of FIG. 19, or in a case where it is determined that there is no empty area that may serve as an evacuation destination of the volume to be relocated in step S116, and it is impossible to relocate the volume to be relocated.

[step S141] Based on the collected data, the management unit 322 designates, in the control information, the storage device name indicating the storage device in which the volume to be operated (the volume to be deleted) is set.

[step S142] Based on the collected data, the management unit 322 designates, in the control information, the RAID group name indicating the RAID group in which the volume to be operated is set.

[step S143] Based on the collected data, the management unit 322 designates, in the control information, the volume name indicating the volume to be deleted.

[step S144] The management unit 322 transfers the generated control information to the control unit 323.

[step S145] Based on the control information, the control unit 323 generates a deletion command for deleting the volume to be deleted.

[step S146] The control unit 323 generates an execution sequence of the generated commands, and generates command information described so that each command is performed in accordance with the execution sequence.

[step S147] The control unit 323 issues (transmits) the generated command information to the controller of the storage device in which the volume to be deleted is set. Thereafter, the process proceeds to step S151 in FIG. 23.

The RAID control unit (one of the RAID control units 211a and 221a) of the controller that has received the command information performs the process of deleting the volume in accordance with the received command information. Upon completion of the process, the RAID control unit transmits a completion notification to the management server 320.

Figure 23:
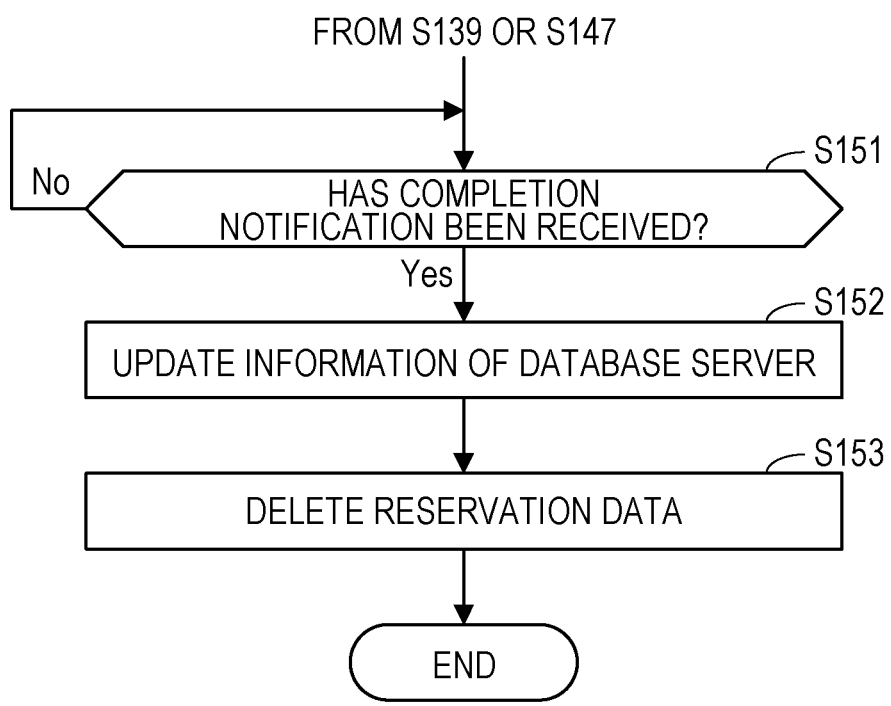
FIG. 23 is a flowchart (part 5) illustrating an exemplary procedure of a volume deletion process.

Description will be continued below with reference to FIG. 23.

[step S151] The control unit 323 is in a standby state until the control unit 323 receives a completion notification corresponding to the command information issued in step S139 in FIG. 21 or in step S147 in FIG. 22. Upon receiving the completion notification, the control unit 323 performs the process of step S152.

Figure 20:
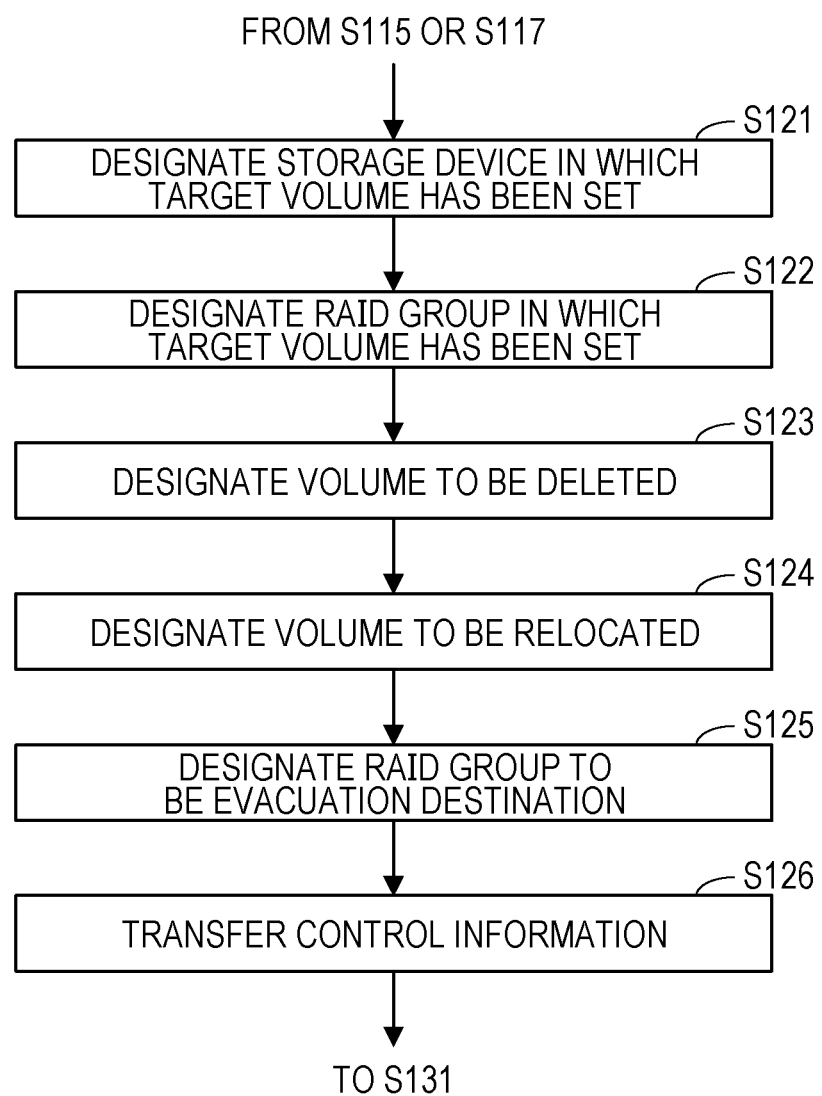
FIG. 20 is a flowchart (part 2) illustrating an exemplary procedure of a volume deletion process.

[step S152] The control unit 323 notifies the management unit 322 that the volume operation based on the control information transferred in step S126 in FIG. 20 or step S144 in FIG. 22 is completed. The management unit 322 requests the database server 310 to update the management table and reflects the change in the resource usage status due to the volume operation in the management table.

In response to the request from the management unit 322, the input/output unit 312 of the database server 310 deletes a record in which the volume to be deleted is registered from the virtual disk table 311c, the volume table 311d, and the storage area management table 311e. In addition, in a case where the relocation of the volume is performed, in response to the request from the management unit 322, the input/output unit 312 updates the storage area management table 311e so that the reservation for the evacuation destination area reserved in step S115 or step S117 in FIG. 19 is released. As a result, the status of the evacuation destination area in the storage area management table 311e is changed from "Reserved" to "Free".

[step S153] The management unit 322 deletes the reservation data read in step S111 of FIG. 19 from a reservation data management table 321a. In addition, the management unit 322 deletes the collected data registered in the collected data management table 321b in step S112.

According to the processes of FIGS. 19 to 23, in the RAID group in which the volume to be deleted is set, in a case where another volume exists at an address lower than an address of the volume to be deleted, relocation of the volume at the lower address is performed. As a result, the continuous empty area larger than the deleted volume is formed in the logical storage area of the RAID group. For this reason, it is possible to newly set a volume larger than the deleted volume in the RAID group, and as a result, it is possible to improve the utilization efficiency of the storage area corresponding to the RAID group.

In addition, the preprocess for deleting a volume and relocating a volume (for example, determination of necessity of relocation or determination of evacuation destination) and the generation process of a series of commands for deleting a volume and relocating a volume is, based on the management table registered in the database server 310, performed by the management server 320 instead of by individual storage devices in which the volume operation is performed. The generated command is issued to the storage device, and the storage device performs the volume operation in accordance with the issued command. With such processes, the storage device may accurately perform a series of processes including a deletion of a volume, an evacuation of a volume, a write-back of a volume, and a path change. In particular, it is possible to accurately perform the above-described volume operation while keeping access available from the virtual machine to the volume to be relocated. For example, a situation such as an insufficient capacity of an evacuation destination area of a volume, an unintentional communication disconnection, a data destruction, and the like during the volume operation may be suppressed.

The preprocess and the command generation process described above are not performed by the controllers 211 and 221 of the storage devices 210 and 220, so that the processing load of the controllers 211 and 221 of the storage devices 210 and 220 may be reduced. Therefore, it is possible to reduce the influence of the process for volume operation on the access speed to respective virtual disks from each virtual machine.

The processing functions of the devices (for example, the management device 3, the server devices 110 and 120, the controllers 211 and 221, the database server 310, and the management server 320) described in the above-described embodiments may be implemented by a computer. In this case, a program describing processing contents of the function of each device is provided and the computer executes the program to implement the above-described processing function. The program describing the processing contents may be recorded in a computer-readable recording medium. Examples of the computer-readable recording medium include a magnetic memory device, an optical disc, a magneto-optical recording medium, and a semiconductor memory. Examples of the magnetic memory device include a hard disc drive (HDD) and a magnetic tape. Examples of the optical disc include a compact disc (CD), a digital versatile disc (DVD), and a Blu-ray Disc (BD, registered trademark). Examples of the magneto-optical recording medium include a magneto-optical disc (MO).

When distributing the program, for example, a portable recording medium such as a DVD or a CD on which the program is recorded is sold. It is also possible to transfer the program, which is stored in the memory device of a server computer, from the server computer to another computer through a network.

The computer that executes the program, for example, stores in its own memory device the program recorded in the portable recording medium or the program transferred from the server computer. The computer reads the program from its own memory device and executes the process in accordance with the program. The computer may read the program directly from the portable recording medium, and execute processing in accordance with the program. Each time a program is transferred from a server computer coupled the computer via a network, the computer may sequentially execute processing in accordance with the received program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system, comprising:
   a plurality of storage devices each including a memory that has one or more storage areas and the memory configured to set one or more volumes for each of the one or more storage areas, each of the one or more volumes having an address space same as an address space of an area, in which each of the one or more volumes is set, within a storage area among the one or more storage areas; and a management device including a processor configured to:
determine, upon receiving a request for deletion of a first volume set in a first storage area among the one or more storage areas of a first storage device among the plurality of storage devices, whether a second volume different from the first volume is set in the first storage area based on management information for managing a setting state of volumes in each of the one or more storage areas of each of the plurality of storage devices;
detect, when it is determined that the second volume is set, a continuous empty area equal to or larger than the second volume from among the one or more storage areas of a second storage device among the plurality of storage devices based on the management information;
cause the first storage device to perform the deletion of the first volume from the first storage area;
cause the first storage device to perform evacuation of data of the second volume to the continuous empty area;
cause the first storage device to perform, upon completion of the evacuation, migration of the second volume by writing the data of the second volume back to a migration destination area within the first storage area from the second storage device, the migration destination area including an area in which the first volume is set before the deletion of the first volume, and
update the management information to indicate that the first volume has been deleted and the second volume has been migrated.

2. The information processing system according to claim 1, wherein
the memory is further configured to set the one or more volumes for each of the one or more storage areas in order from a highest address, and
the processor is further configured to:
determine, upon receiving the request for the deletion of the first volume, whether the second volume is set at an address lower than an address of the first volume in the first storage area, and
the migration destination area starts from a top of the area in which the first volume is set before the deletion of the first volume.

3. The information processing system according to claim 1, wherein
the memory is further configured to set the one or more volumes for each of the one or more storage areas in order from a lowest address, and
the processor is further configured to:
determine, upon receiving the request for the deletion of the first volume, whether the second volume is set at an address higher than an address of the first volume in the first storage area, and
the migration destination area ends at an end of the area in which the first volume is set before the deletion.

4. The information processing system according to claim 1, wherein
the processor is further configured to:
cause the first storage device to copy the second volume to the continuous empty area to perform generation of a third volume;
cause the first storage device to perform deletion of the second volume;
cause the first storage device to copy the third volume to the migration destination area to perform generation of a migrated second volume; and
cause the first storage device to perform deletion of the third volume from the second storage device.

5. The information processing system according to claim 4, wherein
the processor is further configured to:
cause the first storage device to switch a first access path to a second access path between the generation of the third volume and the deletion of the second volume, the first access path being an access path from a first server device to the second volume, the second access path being an access path from the first server device to the third volume, the first server device being registered in the management information as accessible to the second volume; and
cause the first storage device to switch the second access path to a third access path between the generation of the migrated second volume and the deletion of the third volume, the third access path being an access path from the first server device to the migrated second volume.

6. The information processing system according to claim 5, wherein
the processor is further configured to:
cause the first storage device to perform the generation of the third volume in a state where an access to the second volume from the first server device is permitted; and
cause the first storage device to perform the generation of the migrated second volume in a state where an access to the third volume from the first server device is permitted.

7. The information processing system according to claim 5, wherein
the first volume is registered in the management information in association with a virtual disk coupled to a virtual machine operating in a second server device, and
the processor is further configured to:
recognize, upon receiving a request for deletion of the virtual disk, that deletion of the first volume is requested based on the management information.

8. The information processing system according to claim 1, wherein
the processor is further configured to:
update, before causing the first storage device to perform the migration, the management information to indicate that the continuous empty area is reserved; and
update, upon completion of the migration, the management information to indicate that the reserved continuous empty area is released.

9. A management device, comprising:
a processor configured to:
determine, upon receiving a request for deletion of a first volume set in a first storage area among one or more storage areas of a first storage device among a plurality of storage devices, whether a second volume different from the first volume is set in the first storage area based on management information for managing a setting state of volumes in each of the one or more storage areas of each of the plurality of storage devices, each of the one or more volumes having an address space same as an address space of an area, in which each of the one or more volumes is set, within a storage area among the one or more storage areas;
detect, when it is determined that the second volume is set, a continuous empty area equal to or larger than the second volume from among the one or more storage areas of a second storage device among the plurality of storage devices based on the management information;

cause the first storage device to perform the deletion of the first volume from the first storage area;

cause the first storage device to perform evacuation of data of the second volume to the continuous empty area;

cause the first storage device to perform, upon completion of the evacuation, migration of the second volume by writing the data of the second volume back to a migration destination area within the first storage area from the second storage device, the migration destination area including an area in which the first volume is set before the deletion of the first volume, and update the management information to indicate that the first volume has been deleted and the second volume has been migrated.

10. A control method, comprising:

determining by a computer, upon receiving a request for deletion of a first volume set in a first storage area among one or more storage areas of a first storage device among a plurality of storage devices, whether a second volume different from the first volume is set in the first storage area based on management information for managing a setting state of volumes in each of the one or more storage areas of each of the plurality of storage devices, each of the one or more volumes having an address space same as an address space of an area, in which each of the one or more volumes is set, within a storage area among the one or more storage areas;

detecting, when it is determined that the second volume is set, a continuous empty area equal to or larger than the second volume from among the one or more storage areas of a second storage device among the plurality of storage devices based on the management information;

causing the first storage device to perform the deletion of the first volume from the first storage area;

causing the first storage device to perform evacuation of data of the second volume to the continuous empty area;

causing the first storage device to perform, upon completion of the evacuation, migration of the second volume by writing the data of the second volume back to a migration destination area within the first storage area from the second storage device, the migration destination area including an area in which the first volume is set before the deletion of the first volume; and updating the management information to indicate that the first volume has been deleted and the second volume has been migrated.

* * * * *